United States Patent
Leugers et al.

(10) Patent No.: US 10,928,030 B2
(45) Date of Patent: Feb. 23, 2021

(54) VEHICLE LIGHT

(71) Applicant: Kellermann GmbH, Aachen (DE)

(72) Inventors: Johannes Leugers, Aachen (DE); Guido Kellermann, Weilerswist (DE)

(73) Assignee: Kellermann GmbH, Aachen (DE)

( * ) Notice: Subject to any disclaimer, the term of this patent is extended or adjusted under 35 U.S.C. 154(b) by 0 days.

(21) Appl. No.: 16/843,287

(22) Filed: Apr. 8, 2020

(65) Prior Publication Data
US 2020/0232620 A1 Jul. 23, 2020

Related U.S. Application Data

(62) Division of application No. 15/514,848, filed as application No. PCT/DE2015/100397 on Sep. 18, 2015, now abandoned.

(30) Foreign Application Priority Data

Sep. 29, 2014 (DE) ...................... 10 2014 014 068.7
May 12, 2015 (DE) ...................... 10 2015 107 487.7

(51) Int. Cl.
*F21S 43/30* (2018.01)
*F21S 43/241* (2018.01)
(Continued)

(52) U.S. Cl.
CPC ............ *F21S 43/30* (2018.01); *B60Q 1/0052* (2013.01); *B60Q 1/0058* (2013.01); *B60Q 1/14* (2013.01); *B60Q 1/30* (2013.01); *B60Q 1/32* (2013.01); *B60Q 1/34* (2013.01); *B60Q 1/44* (2013.01); *B62J 6/02* (2013.01); *B62J 6/04* (2013.01);
(Continued)

(58) Field of Classification Search
CPC ........ F21S 43/30; F21S 43/241; F21S 43/249; F21S 43/26; F21S 43/247; F21S 43/40; F21S 43/315; F21S 43/243; F21S 43/14; F21S 43/236; F21S 41/24; F21S 41/30; B60Q 1/0052; B60Q 1/0058; B60Q 1/30;
(Continued)

(56) References Cited

U.S. PATENT DOCUMENTS 1,399,973 A 12/1921 Limpert
5,707,130 A 1/1998 Zwick et al.
(Continued)

FOREIGN PATENT DOCUMENTS

DE 664 815 C 9/1938
DE 1 909 009 U 1/1965
(Continued)

OTHER PUBLICATIONS

International Search Report of PCT/DE2015/100397, dated Feb. 26, 2016.

*Primary Examiner* — Thomas M Sember
(74) *Attorney, Agent, or Firm* — Collard & Roe, P.C.

(57) ABSTRACT

A vehicle light, wherein light to be emitted by a base light source which is offset with respect to an emission surface is first conducted radially outwards in targeted manner and is then reflected in an axial direction with respect to the emission surface, uses light-conducting bodies, which are spaced apart from a deflection mirror, or a light-conducting space, which extends first radially and then axially, to obtain as light-intensive, uniform and directional light emissions as possible.

28 Claims, 9 Drawing Sheets

(51) Int. Cl.
*F21S 43/249* (2018.01)
*F21S 43/20* (2018.01)
*F21S 43/247* (2018.01)
*F21S 43/40* (2018.01)
*F21S 43/31* (2018.01)
*F21S 43/243* (2018.01)
*F21S 43/14* (2018.01)
*B62J 6/02* (2020.01)
*B60Q 1/00* (2006.01)
*F21S 41/24* (2018.01)
*F21S 41/30* (2018.01)
*F21S 43/236* (2018.01)
*B60Q 1/14* (2006.01)
*B60Q 1/30* (2006.01)
*B60Q 1/32* (2006.01)
*B60Q 1/34* (2006.01)
*B60Q 1/44* (2006.01)
*B62J 6/04* (2020.01)
*B62J 6/00* (2020.01)

(52) U.S. Cl.
CPC ............... *F21S 41/24* (2018.01); *F21S 41/30* (2018.01); *F21S 43/14* (2018.01); *F21S 43/236* (2018.01); *F21S 43/241* (2018.01); *F21S 43/243* (2018.01); *F21S 43/247* (2018.01); *F21S 43/249* (2018.01); *F21S 43/26* (2018.01); *F21S 43/315* (2018.01); *F21S 43/40* (2018.01); *B60Q 2400/30* (2013.01); *B62J 6/00* (2013.01)

(58) Field of Classification Search
CPC ... B60Q 1/32; B60Q 1/34; B60Q 1/44; B60Q 1/14; B62J 6/02; B62J 6/04
See application file for complete search history.

(56) References Cited

U.S. PATENT DOCUMENTS

| | | |
|---|---|---|
| 6,356,394 B1 | 3/2002 | Glienicke |
| 6,575,610 B2 | 6/2003 | Natsume |
| 2004/0027833 A1 | 2/2004 | Amano et al. |
| 2005/0152141 A1 | 7/2005 | Suzuki |
| 2012/0106190 A1* | 5/2012 | Ben-Levy ............ F21V 7/0091 362/551 |

FOREIGN PATENT DOCUMENTS

| | | |
|---|---|---|
| DE | 202 06 829 U1 | 9/2002 |
| DE | 101 00 281 A1 | 3/2008 |
| DE | 10 2009 020719 A1 | 12/2010 |
| DE | 10 2010 018119 A1 | 10/2011 |
| DE | 10 2011 053032 A1 | 2/2013 |
| EP | 0 780 265 A2 | 6/1997 |
| EP | 1 083 090 A2 | 3/2001 |
| EP | 2 511 601 A2 | 10/2012 |
| EP | 2 796 772 A2 | 10/2014 |
| GB | 820 500 A | 9/1959 |
| JP | 2003 317512 A | 11/2003 |
| JP | 2007 207507 A | 8/2007 |
| JP | 2012 182089 A | 9/2012 |
| WO | 2011/001428 A1 | 1/2011 |

* cited by examiner

VEHICLE LIGHT

CROSS REFERENCE TO RELATED APPLICATIONS

This application is a divisional of and Applicant claims priority under 35 U.S.C. §§ 120 and 121 of U.S. application Ser. No. 15/514,848 filed on May 16, 2017, which application is a national stage application under 35 U.S.C. § 371 of PCT Application No. PCT/DE2015/100397 filed on Sep. 18, 2015, which claims priority under 35 U.S.C. § 119 from German Patent Application Nos. 10 2014 014 068.7 filed on Sep. 29, 2014 and 10 2015 107 487.7 filed on May 12, 2015, the disclosures of each of which are hereby incorporated by reference. Certified copies of priority German Patent Application Nos. 10 2014 014 068.7 and 10 2015 107 487.7 are contained in parent U.S. application Ser. No. 15/514,848. The International Application under PCT article 21(2) was not published in English.

BACKGROUND OF THE INVENTION

1. Field of the Invention

The invention relates to a vehicle light having an emission surface oriented with reference to a main beam direction, and having a base light source disposed behind the emission surface and offset with reference to the emission surface, wherein a radially active light guide body is disposed on the base light source, which body deflects light proceeding from the base light source radially with reference to the main beam direction, onto at least one passive reflector, which reflects the radially deflected light in the direction of the emission surface. Likewise, the invention relates to a vehicle light having an emission surface oriented with reference to a main beam direction, and having a base light source disposed behind the emission surface and offset with reference to the emission surface, wherein an axially active light guide body is disposed on the base light source, which body deflects light proceeding from the base light source axially with reference to the main beam direction, onto at least one deflection mirror, which reflects the light in the radial direction, onto a passive reflector that reflects the radially deflected light in the direction of the emission surface. Also, the invention relates to a vehicle light having an emission surface oriented with reference to a main beam direction, on which at least one formed-on part is disposed, which deflects light from a base light source perpendicular to the main beam direction, in a lateral emission direction. Furthermore, the invention relates to a method for providing light to be emitted in directed manner to an emission surface oriented with reference to a main beam direction, by means of a base light source disposed offset with reference to the emission surface.

2. Description of the Related Art

Such vehicle lights and provision methods are known, for example, from EP 0 780 265 A2, in which illumination of a lens over the largest surface area possible is achieved in that light that proceeds axially from a base light source within a light guide body is first reflected radially outward and then axially again, by means of multiple mirrors, in the direction of the main beam direction. In this regard, it can be assumed that direct emission in the axial direction is prevented by means of the radially deflecting mirror, which is disposed axially in front of the base light source, so that ultimately, an attachment construction space occurs in the region of this mirror surface, which is formed by a depression in the light guide body, but this space is configured to be relatively small in comparison with the base light source and in comparison with the expanse of the emission surface. In view of the intended objective of allowing uniform illumination of the lens over as large a surface area as possible, this is also immediately comprehensible.

SUMMARY OF THE INVENTION

It is the task of the present invention to present a vehicle light of the stated type and a provision method of the stated type, in contrast, which bring about uniform and directed emission, which is as light-intensive as possible.

The task of the invention is accomplished by means of vehicle lights and provision methods having the characteristics of the independent claims. Further advantageous embodiments, if applicable also independent of these claims, can be found in the dependent claims and in the following description.

Thus, a method for providing light to be emitted in directed manner at an emission surface oriented with reference to a main beam direction, by means of a base light source that is disposed offset with reference to the emission surface, can be characterized in that between the base light source and the emission surface, the light is first guided radially outward, proceeding from the base light source, in a light guide space that extends radially with reference to the main beam direction, to a deflection region, and from there axially with reference to the main beam direction, to the emission surface, and is subsequently deflected in a direction axially with reference to the main beam direction, to the emission surface, in the deflection region. In this regard, the light proceeding from the base light source is first guided radially outward and subsequently axially with reference to the emission surface, in the deflection region, wherein it follows a correspondingly shaped light guide space during this process. Because the light is guided in targeted manner in the deflection region, into the light guide space that extends axially with reference to the main beam direction, to the emission surface, it can be emitted at the emission surface in correspondingly directed manner. This arrangement makes it possible to distribute the light uniformly radially from the inside and radially to the outside, and then to guide it in the direction of the emission surface, so that accordingly, uniform emission can be guaranteed.

It should be emphasized that measures can certainly be provided on the emission surface itself, by means of which the main emission region is varied or manipulated at the transition from the emission surface to free space. This can be implemented, for example, by means of correspondingly optically active formed-out parts or formed-on parts on the emission surface. Because the main emission direction ultimately presents itself as the average of all the emitted light beams, such a change in the main emission or main beam direction has no influence on the actual processes in the interior of a corresponding vehicle light, in other words on the processes behind the emission surface, viewed from the outside, so that in the present case, only the main emission direction in the interior of the vehicle light is important.

In the present connection, it should be emphasized that the terms "radial(ly)" and "axial(ly)" relate to the main emission direction, in each instance, wherein the predominant direction component is supposed to be directed accordingly, in each instance, while recognizable but smaller components perpendicular to this can certainly still be found.

A construction space that is as small as possible in the axial direction can be guaranteed if the axial expanse of the light guide space that extends radially with reference to the main beam direction, to the deflection region, is smaller than its radial expanse. This then accordingly leads to the result that the light to be emitted in directed manner is available radially far outside, so that a correspondingly great offset can be guaranteed with such an arrangement.

Also, the radial expanse of the light guide space, which extends axially with reference to the main beam direction, to the emission surface, can be smaller than its axial expanse, so that the overall arrangement has a relatively narrow construction with regard to the axially extending light guide space. This leads to very light-intensive emission, because all the light must be guided through this light guide space, which is relatively narrow in the axial direction.

In itself, it is conceivable to configure the light guide space to be empty, at least in parts, if applicable in very large parts, since the light is influenced very little in an empty space, for example only influenced by air atoms, and thereby weakened. If necessary, a light-guiding effect can be reinforced by means of suitable measures at the wall, for example by reflective devices, so that scattered light or diffuse light also gets to the emission surface by way of the light guide space, in order to further increase the overall brightness of the emission surface.

On the other hand, it is understood that one or more light guide bodies can be disposed in the light guide space, wherein then, a corresponding loss of light must be accepted, if applicable, or then, correspondingly suitable materials must be used for the light guide body, which bring with them losses that are as low as possible or can be managed to be as low as possible, and, if necessary, can also act on the light guided in the light guide space by means of suitable measures, such as boundary surface reflections and refraction.

In this regard, it is conceivable, on the one hand, that the light guide space is entirely filled with a corresponding material, which—if necessary—then can also provide the emission surface. Because generally, the emission surface is always constituted by a physical or material body, generally a light-guiding body will be found in the region of the emission surface, wherein it is certainly not necessary to configure this light-guiding body specifically with light-guiding properties if the path length that the light must travel through this light-guiding body to the emission surface is correspondingly slight. In particular, light-refracting or light-scattering measures or means that influence the emission cone or the emission direction can be provided in this body that carries the emission surface, which measures or means act on the directed light, at least in part, if this appears to be necessary for special reasons, such as due to provisions of law, for example.

Preferably, however, a noteworthy space is taken up by light guide bodies in the light guide space, and a further noteworthy space is left empty, so that boundary surface effects, in particular, such as transitions between different materials, particularly between the materials of the light guide body and the empty space, are utilized in refractory manner or for boundary surface reflections, on the one hand, and on the other hand, possible losses due to light guide bodies through which the light must pass unnecessarily, which would furthermore be relatively cost-intensive, can be avoided.

In particular, it is conceivable that part of the light proceeding laterally from the base light source is refracted at least once in the radial direction, in order to be guided radially outward. In demarcation from the state of the art, in this way, light proceeding laterally, in other words with a radial component, which will generally, however, still have a noteworthy axial or forwardly directed component, will be deflected to the emission surface in directed manner, and this accordingly increases the intensity of the light provided by the base light source at the emission surface. In this regard, it is not absolutely necessary that this light proceeding laterally from the base light source is refracted directly, up to perpendicular to the main beam direction. Instead, it is conceivable that a corresponding guiding influence, such as refraction or reflection, is exerted on this light at yet another location. Likewise, it is conceivable that this light, which leaves the base light source laterally, is also used so that it is guided to the emission surface at an angle, accordingly, so that lateral emission to the emission surface is also brought about, accordingly.

For the refraction process described above, a light guide body is preferably used, which body—depending on the concrete implementation—can reach all the way to the emission surface or ends before it, particularly in order to allow yet another refraction process at the corresponding end, with which this light can then be directed in targeted manner once again, accordingly.

In this regard, a vehicle light having an emission surface oriented with reference to a main beam direction and having a base light source disposed behind the emission surface and offset with reference to the emission surface, in which a radially active light guide body is disposed on the base light source, which body deflects light proceeding from the base light source radially with reference to the main beam direction, into at least one passive reflector, which reflects the radially deflected light in the direction of the emission surface, allows emission that is as light-intensive, uniform, and directed as possible, if the vehicle light is characterized in that the radially active light guide body is disposed at a distance from the passive reflector.

Upon exit from the radially active light guide body, radially active refraction processes can then take place accordingly, which bring about very great deflection angles in the radial direction at the transition from the light guide body to air, or to another medium having a correspondingly lower index of refraction, so that even light that is emitted laterally by the base light source with a lesser radial direction and more forward or axially, can be sufficiently deflected in the radial direction. In this manner, a very compact arrangement can be guaranteed, in particular—if the vehicle light is suitably configured—because correspondingly great angles of refraction can be implemented, particularly upon exit from the radially active light guide body, especially, of course, if two refraction processes, once upon entry into the radially active light guide body and once upon exit from the radially active light guide body take place.

As already stated above, it is advantageous if an empty space is disposed in the distance between the radially active light guide body and the passive reflector, because in this way, correspondingly great radial deflection is possible, so that the greatest possible proportion of light that leaves the base light source laterally can be deflected in the desired direction. This can take place, depending on the concrete implementation, up to a direction perpendicular to the main beam direction, wherein—depending on the concrete implementation—this is not absolutely necessary, as long as the light can be guided in the direction of the passive reflector, with sufficient deflection.

Preferably, the radially active light guide body has at least one radial coupling region, which is configured in such a manner that coupled light proceeding from the base light source is radially refracted upon entry into the radial coupling region. This means that the surface of the light guide body is configured, in the region of the coupling region, and oriented with reference to the base light source, in such a manner that light proceeding from the base light source, which hits this radial coupling region, is refracted in the radial direction. In this regard, it is understood—since the base light source naturally is not point-shaped, but rather possesses a spatial expanse—that light beams that proceed from other spatial areas of the base light source are possibly treated differently, particularly refracted axially. By means of a suitable formation of the radial coupling region, it can be guaranteed that as much laterally emitted light of the base light source as possible, if applicable also part of light that emitted forward or axially, is refracted in the radial direction during coupling and preferably is already parallelized or focused in a certain manner as this happens. The light that is already pre-directed in this manner can then be guided to the emission surface in different manner, as has already been indicated above or also as will still be explained below.

Preferably, the radial coupling region is disposed to the side of the base light source, so that corresponding coupling and guiding in the radial direction can take place in structurally simple and operationally reliable manner. In particular, the lateral placement of the radial coupling region allows light that leaves the base light source laterally to be captured in simple and directed manner.

Light that is coupled into the light guide body by way of the radial coupling region can be radially conducted further up to a decoupling region of the light guide body. Such a decoupling region is found, at the latest, on the emission surface, if the radially active light guide body is integrated into an overall light guide body that reaches all the way to the decoupling surface. In the case of such a configuration, further refraction within the light guide body can generally not be expected, because this body—if only for cost reasons—should generally be configured with a uniform index of refraction.

Particularly if the radially active light guide body is disposed at a distance from the passive reflector, it is advantageous if the light is refracted in the radial direction during decoupling. In this way, the light can be directed, in other words focused, if necessary, or also parallelized, in desired manner during decoupling, with the possibility of generally achieving relatively high angles of refraction during decoupling from a light guide body.

In particular, an axially active light guide body can be disposed on the base light source, which body deflects light proceeding from the base light source axially with reference to the main beam direction, onto at least one deflection mirror, which reflects the light onto the passive reflector in the radial direction. Such an axially active light guide body, in interplay with the deflection mirror, makes it possible to treat the part of the light that can only be deflected with difficulty in the radial direction, by way of the radially active light guide body, to such an extent that the light actually reaches the passive reflector, in different and targeted manner, and to deflect it axially, at least in part, and thereby to focus it or parallelize it, so that it can then be reflected onto the passive reflector, by way of the deflection mirror, in the radial direction.

In this regard, it is understood—depending on the concrete implementation—that the deflection mirror can be configured directly on the axially active light guide body; this can be implemented, for example, by means of a corresponding mirror coating or also by means of boundary surface reflection or by means of total reflection. The latter means that the light does not yet leave the axially active light guide body even after being reflected at the deflection mirror, something that is non-critical, in itself, to the effect that correspondingly axially directed light can be deflected by way of a mirror, generally without further refraction or diffraction processes, parallelized or parallel to a radial direction to a comparatively great extent, in order to reach its goal in the passive reflector in this way. On the other hand, it is understood that in concrete applications, refraction processes can certainly still take place in targeted manner when the light reflected away by the deflection mirror leaves the axially active light guide body. If applicable, it will be necessary to make certain compromises if the axially active light guide body and the radially active light guide body are configured in one piece as a light guide body, and if the light paths of the light that leaves the base light source laterally and of the light that leaves the base light source toward the front or axially intersect or lie tangent to one another. If necessary, however, compensation can take place in this regard by way of the concrete configuration of the deflection mirror or of an axial coupling region.

While the latter arrangement has a particularly narrow construction in the axial direction, a corresponding gain in construction space might actually not be necessary at all, in order to justify the complications connected with it. Accordingly, it can be advantageous to separate the light paths of the light that proceeds from the base light source toward the front or axially, on the one hand, and the light that proceeds from the base light source laterally or radially, on the other hand, in the region or the light guide body disposed on the base light source or until completion of guidance in a radial direction, something that generally requires a structural distance between the deflection mirror, on the one hand, and the radial coupling region or the radial uncoupling region, on the other hand.

The most light-intensive, uniform, and directed emission can thereby be achieved even in the case of a vehicle light having an emission surface oriented with reference to the main beam direction, and having a base light surface disposed behind the emission surface and offset with reference to the emission surface, wherein an axially active light guide body is disposed on the base light source, which body deflects light that proceeds from the base light source axially with reference to the main beam direction, onto at least one deflection mirror, which reflects the light in the radial direction, onto a passive reflector, which reflects the radially deflected light in the direction of the emission surface, if the vehicle light is characterized in that the axially active light guide body is disposed at a distance from the deflection mirror. Such a configuration particularly allows very good parallelization of the light of the base light source that is emitted in the axial direction or toward the front, before it reaches the deflection mirror, if necessary. In particular, relatively great angles of refraction can be achieved, if applicable at the transition between the axially active light guide body and the medium in which the deflection mirror is disposed, which angles accordingly are able to parallelize or axially orient even light that is axially emitted by the base light source with a comparatively great lateral or radial component, to a sufficient degree so that it reaches the deflection mirror uniformly and in directed manner, with great intensity, and can then be reflected by this mirror onto the passive reflector.

Supplemental to the axially active light guide body, it is then accordingly advantageous if a radially active light guide body is disposed on the base light source, which body deflects light proceeding from the base light source radially with reference to the main beam direction, onto at least one passive reflector. In particular, such a radially active light guide body can have the characteristics already presented above in this regard.

It is understood, on the other hand, that if applicable part or the predominant part of the light proceeding laterally from the base light source is first reflected in the axial direction by a capture mirror, and subsequently can be guided in the radial direction, preferably reflected by the deflection mirror, for example, in order to be guided radially outward. It is true that this method of procedure results in a certain axial increase in construction height, because then the corresponding capture mirror would deflect light, which has already been radially directed, in the axial direction, so that extra axial construction space has to be left for this mirror. Such a capture mirror, which acts in capturing manner, can be implemented structurally as a separate mirror, on the one hand, or as a mirrored surface, or as a mirror of a light guide body that acts by way of boundary surface reflection or total reflection. In the case of such an embodiment, both a radial coupling region and an axial coupling region can be provided in the region of the capture mirror, if the latter is configured in the light guide body, because this ultimately is connected with the concrete orientation of the mirror and here, the light proceeding laterally from the base light source can actually be pre-directed with reference to the capture mirror already during coupling, if applicable.

A vehicle light can be implemented in structurally simple manner and with the least possible loss of light output if the deflection mirror and the passive reflector are disposed at a distance from one another. On the other hand, it is understood that the two mirrors, in other words the deflection mirror and the passive reflector, can be implemented in a single light guide body. The latter also holds true for the capture mirror.

As has already been explained above, the axially active or the radially active light guide body, on the one hand, and the deflection mirror, on the other hand, can be disposed at axially different heights. In this way, the light that leaves the light guide body and the light reflected by the deflection mirror can be directed onto the passive reflector without crossing, at first.

Depending on the concrete implementation, the light leaving the light guide body and the light reflected by the deflection mirror can impact different regions of the passive reflector, so that accordingly, it is advantageous if the light guide body and the deflection mirror jointly correspond to the axial expanse of the passive reflector, in terms of their axial expanse, and this accordingly leads to the smallest possible construction height in the axial direction. On the other hand, the light that leaves the light guide body in the radial direction and the light reflected in the radial direction by the deflection mirror can be directed at the same region of the passive reflector, in each instance, so that in particular, a narrower passive reflector can be used. The latter then leads to a corresponding gain in construction space radially on the outside. Because then, of course the light beams that come from the deflection mirror are inclined relative to the light beams that exit from the base light source, this results in a corresponding angle of inclination after reflection at the passive reflector, but this angle can, under some circumstances, lead to undesirable results, because in this manner, the light that proceeds toward the front or axially from the base light source, for example, also radiates axially onto the emission surface and can be passed on from there accordingly, while the light that leaves the base light source laterally in any case then also arrives at the emission surface at a corresponding angle, and accordingly can be emitted there with a lateral component.

As was already presented above, it is advantageous if a passive reflector reflects the light, in the deflection region, in a direction axially with reference to the main beam direction, toward the emission surface. It is structurally simple if, with reference to an angle position related to the main beam direction, precisely one passive reflector is used in this regard.

Particularly uniform distribution of the light can be made possible in that the mirrors used, particularly the passive reflectors, the deflection mirrors and the capture mirrors, are merely configured singly, in each instance, with reference to a radius or with reference to an angle position relating to the main beam direction. In particular, rotating arrangements, which are configured in accordance with the prevailing symmetry, can be used as corresponding mirrors. Accordingly, it is also advantageous to configure the light guide bodies in the symmetry of the overall arrangement, and to select continuous lines for the coupling and decoupling regions per radius. This results in the greatest possible uniformity of the correspondingly deflected light, already individually but particularly in interplay, particularly in deviation from the state of the art, where multiple mirrors, which lead to corresponding structures in the light that is passed on, are used. It is understood that in this connection, smaller irregularities, such as cable ducts, holders, positioning aids or small areas with partially transmissible mirrors, for example, are non-critical, as long as the light intensity, the uniformity, and the directedness of the emission are influenced only insignificantly.

Preferably, the radial expanse of the passive reflector corresponds to the radial expanse of the emission surface. Accordingly, a light guide space can then be provided, which also corresponds to the emission surface and the passive reflector in terms of its radial expanse, so that light can be guided from the passive reflector to the emission surface in axially directed manner, preferably parallel in large parts.

Fundamentally, almost any desired shape of the emission surface can be replicated by means of the configuration of the passive reflector, in a radial respect, to the extent that it follows the shape of the emission surface, and uniformly and intensive, directed light radiation can be implemented. This particularly holds true if the emission surface is configured in ring shape, for example, or also to form an edge around an area in some other way. Any irregularities in the radiation density, which can be caused by an emission surface having a complex shape or by a passive reflector having a complex shape, can be taken into consideration or compensated by means of corresponding redistribution during deflection of the light from the base light source in the radial direction.

As was already indicated above, it is advantageous if an empty space is disposed in the distance between the radially active light guide body and the passive reflector, between the axially active light guide body and the deflection mirror and/or the deflection mirror and the passive reflector. Aside from the structural simplification and the saving in material and light, this can particularly lead to outstanding optical results, since great refraction angles can be achieved at the transition from a light guide body to the free space, and since optical mirrors demonstrate high degrees of effectiveness with surfaces or walls effectively mirrored toward an empty space. It is understood that the empty space will generally be filled with air, if only because of gaps that occur in the housing wall of such an arrangement by its nature. On the other hand, it is conceivable to evacuate the empty space by means of suitable sealing measures, in order to further increase a difference in the indices of refraction. Likewise, it is accordingly conceivable to fill other gaseous media into the empty space, in order to exert an influence accordingly. On the other hand, it is conceivable to provided solid or liquid media at these locations, the latter with suitable corresponding sealing.

Depending on the concrete implementation, it is advantageous, on the other hand, if the mirror or at least one of the mirrors is structurally implemented by means of boundary surface reflection, particularly by means of total reflection. In this regard, it is understood that—purely physically—individual light beams or a part of the light penetrate(s) the corresponding boundary surface even in the case of total reflection, even if this occurs only to a slight degree, if applicable. In particular, however, it is not absolutely necessary in all cases to work with total reflection, since under some circumstances, sufficient light is already reflected at the corresponding boundary surface as slight angles, in order to be able to achieve the optically desired intensities. Then mirror angles that lie below total reflection can also be used, to corresponding advantage.

Cumulatively or alternatively to this, the mirror or the mirrors can be provided by means of a surface of a light guide body that is effectively mirrored toward the inside. In the case of such an embodiment, light that threatens to leave the respective light guide body in spite of boundary surface reflection or total reflection can nevertheless be reflected by way of the mirrored surface. Vice versa, such a mirrored surface can also be advantageously used as a mirror even independent of the respective angle, and therefore independent of the use of all boundary surface reflection or total reflection according to its intended purpose.

Depending on the concrete embodiment, it can also be advantageous, on the other hand, as was already explained above, if the mirror or at least one of the mirrors is/are provided by means of a mirrored wall, which—as has already been explained above—can reflect light beams in particularly effective manner. This is preferably a mirrored wall of an empty light guide space. In this regard, the wall can particularly be configured to be non-transmissible for light, so that other optical devices, in particular, such as other light sources having different light paths, which are provided directly next to the corresponding light guide space, cannot capture any outside light. In an alternative embodiment, the corresponding wall can merely be partially mirrored, so that additional light from other light sources, for example from supplemental light sources, which are supposed to significantly increase the light output emitted in total by way of the emission surface in particular operating situations, can additionally be coupled in by means of these partially mirrored walls.

Thus, depending on the concrete implementation, the passive reflector, but also the deflection mirror or the capture mirror can be provided by way of boundary surface reflection and/or by means of a surface of a light guide body that is effectively mirrored toward the inside, or, alternatively, by means of a mirrored wall of the light guide space.

The passive reflector and the body that has the emission surface can be spaced apart from one another; this is particularly the case if the passive reflector is implemented by means of a different module. Because of the distance between the passive reflector and the body that has the emission surface, the latter can particularly be installed separately from one another. Furthermore, in this way, a weight reduction can be implemented in this way, if necessary, particularly if an empty space is preferably disposed in the distance between them, something that accordingly then also leads to lower light losses. On the other hand—if applicable—this can lead to certain losses in stability and to difficulties in orienting the passive reflector with reference to the emission surface. Therefore it can be advantageous, on the other hand, if the passive reflector and the emission surface are configured on an identical module, particularly on a light guide body. In the case of such an embodiment, the passive reflector is preferably implemented by means of boundary surface reflection or by means of a surface that is correspondingly effectively mirrored inward. This embodiment allows easy installation and, in particular, easy orientation of the two modules relative to one another.

Depending on the concrete case of use, it is conceivable that the base light source does not provide sufficient light in particular application situations. This can be the case, for example, if the base light source is used to provide a taillight by way of the emission surface, and if a brake light, which requires significantly greater emission output by its nature, is supposed to be implemented by way of this same emission surface. If this cannot be implemented by means of increasing the lighting power of the base light source, supplemental light sources can be provided, as has already been indicated above, which couple supplemental light into the light guide space and emit it to the emission surfaces. For this purpose, the supplemental light sources are accordingly directed at the emission surface, so that this emission surface can also emit the light from the supplemental light sources.

Preferably, the supplemental light sources are directed axially at the emission surface, because—as has been shown in experiments by the inventors—the strong lighting power and, in general, the short lighting time for brake lights, for example, outshine or do not require extreme uniformization, which is desirable for the light of the base light source.

In this regard, it is proven to be particularly advantageous if the light path of the supplemental light source to the emission surface or the supplemental light source interrupts the passive reflector or passes through it. The former can be implemented if this interruption is sufficiently small and therefore only insignificantly impairs the uniformity of the light guided by the base light source to the emission surface, in directed manner. The latter, in contrast, can be implemented by means of a partially transmissible mirror, so that the light from the base light source as such is easily reflected and the light from the supplemental light sources can be coupled into the light guide space through the partially transmissible mirror.

Purely theoretically, it is conceivable that the base light source comprises multiple individual light sources, wherein the, if necessary, very complicated measures have to be taken in order to be able to implement sufficiently uniform and directed emission. For this purpose, very complicated light guide bodies with partially transmissible mirrors and the like can be necessary. Particularly preferably, however, the base light source is a single light source, so that the overall arrangement has a relatively simple structure and ultimately the measures described above with regard to conducting the light serve to distribute the light of this one single light source uniformly on the emission surface. In this regard, it is understood that particularly when using a single light source, the greatest possible light yield is required in order to be able to implement light-intensive, uniform, and directed emission. The light guide bodies or light path guides explained above particularly serve this purpose.

Although a radially directed light source appears advantageous, at first, due to the offset as such, it is advantageous if the base light source, if, in particular, a single light source is provided as a base light source, is directed axially. This orientation allows distributing the axially directed light as uniformly as possible and providing it to the emission surface, by way of radial deflection. The latter requires a more complex light guide path in the case of a light source that is directed differently, corresponding equalization measures and/or additional passive reflectors or other optical devices, which then require corresponding structural effort and generally are nevertheless unable to provide light that is as uniform and intensively directed.

Accordingly, it is advantageous if the base light source is a central light source, because this also brings about a relatively simple optical structure to achieve the most light-intensive, uniform, and directed emission possible.

In particular, the emission surface can be in ring shape and/or oriented around a central beam axis. In this regard, a ring-shaped emission surface makes it possible that a different space or a different surface can be enclosed by it, which can be used for different purposes, for example as an emission surface for a different light source. In this way, a vehicle light that is correspondingly attractive in shape can be implemented. Orientation with reference to a central beam axis as such allows slightly greater freedom in the design of the emission surface, which must at least close—configured in ring shape. By means of a central beam axis, corresponding symmetry of the overall arrangement can be predetermined, on the basis of which symmetry the uniformity of the emission can then be measured.

Preferably, the base light source, particularly if it has a single light source, is disposed centrally on the central beam axis, particularly oriented axially along the central beam axis. This then allows corresponding utilization of the symmetry, thereby making it possible to guarantee uniform and directed emission in corresponding structurally simple manner.

Possible deviations from a ring symmetry or rotation symmetry about the beam axis can be compensated, if necessary, by means of non-uniform distribution of the light in front of the passive reflector, as was already explained above.

Likewise, it is advantageous if the light guide body is disposed centrally on the central beam axis, thereby making it possible to guarantee good and uniform light distribution, accordingly. The latter can particularly be implemented also by means of a corresponding central placement of the deflection mirror or of the capture mirror.

In general, the passive reflector will be radially very far away from the central beam axis, so that here, it is frequently very difficult to speak of a central placement of the passive reflector. However, it is correspondingly advantageous if the passive reflector and, if applicable, also the emission surface are disposed with the greatest possible symmetry with reference to the central beam axis.

It is particularly advantageous if the vehicle light is configured essentially with rotation symmetry with reference to the central beam axis. This does not necessarily have to apply to all the modules, such as, for example, the concrete configuration and placement of a circuit board, the concrete placement of electrical lines, as well as the concrete placement of a housing holder. In particular, however, it is advantageous if the optical devices are accordingly configured with rotation symmetry with reference to the beam axis, wherein here, too, small deviations, such as, for example, cable ducts or the like, certainly will not have a disruptive effect. On the other hand, slightly lower symmetries, such as point symmetries or surface symmetries, which include the beam axis, can bring corresponding advantages with them. In particular, elliptical ring-shaped emission surfaces as well as corresponding optical devices such as passive reflectors, light guide bodies, and deflection mirrors that are adapted to them have proven themselves.

In a particularly preferred embodiment, the emission surface is configured perpendicular or with rotation symmetry with reference to the main beam direction or with reference to the central beam axis. Small deviations from this do not influence the optical overall appearance, by their nature, as has already been explained above.

The high symmetries explained above, particularly a ring shape around the main beam direction, can, however, lead to an undesirably high light density on a central axis of the emitted light, because the emission cones that proceed from the emission surface, situated, in section through the main beam direction, in each instance, meet there. In such a situation, it can be advantageous if the emission cone and/or the emission direction of the light emitted by the emission surface, seen in section through the main beam direction, in each instance, is varied, something that can be done using suitable variation means. Such variation means can, for example, be implemented by means of optically active structures that act differently on the light that interacts with them, rotating around the main beam direction. Thus, for example, the mirrors can be configured to rotate around the main beam direction at different angles of inclination or also with different curvatures. The same holds true for optically active surfaces, such as, for example, transitions between light guide bodies and empty spaces, or such as the emission surface. Likewise, if multiple light sources are used, these can be provided with different emission cones and/or be mounted in beam directions that deviate from the radial direction. In this manner, superimpositions of overly great light intensity can be minimized, with the variation in the rotation direction around the main beam direction being selected to be sufficiently slight so that the variations are preferably hardly noticeable to the human eye, if at all, or only in certain operational situations, so that a uniform appearance of the vehicle light is not impaired, if possible.

Preferably, the variation means are disposed between the base light source and the emission surface, so that on the one hand, they can be used with little effort, and on the other hand, without impairing the external spatial appearance of the vehicle light. Thus, for example, sine-like or other periodic changes of the mirrors and/or of the light entry and/or exit surfaces of light guide bodies can serve as variation means, by means of which the light can then be fanned out to different degrees or locally varied in terms of its emission direction during its exit from the emission surface.

A change in the emission direction can consist, on the one hand, in a change in the angle of inclination of the local emission direction toward the main beam direction or away from it. On the other hand, a change in the emission direction can also be present with regard to the angle of the emitted light with reference to the main beam direction and the respective exit point of the light emitted from the emission surface, in each instance, which angle can also be subject to local variation in the circumferential direction about the main beam direction.

The change in the emission direction can, however, also serve for other purposes than variation along the ring shape or about the central beam axis, for example in order to irradiate individual locations of the emission surface, in which formed-on parts are disposed, for example, in targeted manner, or, alternatively, in order to manipulate the light independent of the variation. Corresponding manipulation means, such as concave or convex mirrors, for example, or mirror regions or light entry or exit surfaces of light guide bodies or other optically active devices are preferably also disposed within the housing of the vehicle light, in other words between the base light source and the emission surface.

Within the offset, an attachment construction space can be disposed axially in front of the base light source, in which space modules of the vehicle light are disposed, which first of all are not related to the optical devices of the base light source and the related emission surface. Electrical devices, or also a horn or the like, for example, can be disposed in such an attachment construction space, wherein then, the base light source can be found behind this construction space, and light-intensive, uniform, and directed emission of the light of the base light source can take place laterally relative to the attachment construction space, by way of the offset and the correspondingly offset emission surface.

Preferably, the attachment construction space is optically separate from the light guide space between the base light source and the related emission surface, so that no light gets out of the light guide space into the attachment construction space—and vice versa.

Optical separation is particularly advantageous when an attachment light source is disposed in the attachment construction space, which then leads to the result that the base light source and the attachment light source can easily be controlled separately and used for different purposes.

By means of an attachment light source disposed in the attachment construction space, it is therefore possible to provide a vehicle light that allows a combination of types of light that are supposed to or must be used in vehicles.

In general, a corresponding attachment light source will also have an attachment light source emission surface, if only to protect the attachment light source from external influences.

In this regard, it can be advantageous if a main beam direction or an axis of symmetry of the attachment light source essentially corresponds to the main beam direction or the central beam axis of the emission surface that belongs to the base light source. In this connection, it is understood that smaller deviations, which possibly can also be owed to provisions of law, such as a specific structuring of a dimmed headlight, for example, do not impair the definition of a main beam direction, which is frequently defined by the intended direction of travel of the respective vehicle. Within certain limits, all vehicle lights are oriented, with reference to the direction of travel of the vehicle, to correspond as intended with their main beam directions or with their light fields, which are fanned out about a main beam direction that forms a light center.

If the emission surface and the attachment light source emission surface make a flush transition into one another, the risk of manipulations, in particular, can be reduced to a minimum. If the vehicle light is used as a motorcycle light, such a flush arrangement furthermore allows minimization of possible flow noises, which can be extremely bothersome during motorcycle travel, particularly for the driver himself/herself.

Depending on the concrete embodiment of the vehicle light, the body having the emission surface and the body having the attachment light source emission surface can be configured in one piece with one another. Under some circumstances, suitable measures, such as, for example, only a very small or very thin connection of the two bodies are then necessary, in order to limit overly strong jumping over of light between the two emission surfaces, in targeted manner, to a desired degree. If applicable, corresponding jumping over can also be advantageous, because then, the entire emission surface, which is available to the base light source or the attachment light source, then increases, at least within limits, because a certain proportion of scattered light or diffuse light gets to the adjacent emission surface by way of the common one-piece body, in each instance. This is particularly advantageous if the two light sources glow with the identical color.

In a concrete implementation, a wall of the attachment construction space can form a wall of the light guide space for the base light source, and accordingly, this allows a particularly compact method of construction of the overall arrangement. The wall can be configured—as has already been explained above—to be non-transmissible for light, in order to restrict any jumping over of light between the two light sources to a necessary minimum. It is understood that the wall can accordingly also be mirrored at suitable locations or locations provided for this purpose, if necessary, in order to be able to act as a wall of the light guide space, in light-guiding or light-conducting manner, accordingly.

Cumulatively or alternatively, the wall of the attachment construction space can lie against one of the light guide bodies and can position it with reference to the other vehicle light or, in this way, position the attachment construction space with reference to the light guide body. In this regard, the wall does not necessarily have to be reflectively active or itself act to conduct light, as long as the light guide body itself is sufficiently active in this regard.

In the case of a vehicle light having an emission surface that is oriented with reference to a main beam direction, on which surface at least one formed-on part is disposed, which deflects light from a base light source perpendicular to the main beam direction into a lateral emission direction, the most directed emission possible can be brought about, with an emission surface that is attractive in shape and as uniform as possible, if the formed-on part comprises a recess in a body that has the emission surface. In this manner, the formed-on part can be configured as unobtrusively as possible, with a suitable configuration, and to project only slightly above the emission surface, something that gives the emission surface the most uniform external appearance possible.

In this regard, the formed-on part can particularly be configured and oriented in such a manner that light is reflected at one of its surfaces, and this surface forms an edge around the recess. This then brings about the result that a correspondingly reflective surface can be found other the remaining surface of the emission surface, in other words farther inward, so that the light that is then reflected reaches the emission surface or a further region of the formed-on part significantly deeper, with reference to the emission surface, and therefore the formed-on part does not have to project so far above the emission surface.

The recess of the formed-on part therefore has the result, if configured suitably, that the formed-on part projects above the emission surface to an extent reduced by the recess.

Likewise, in the case of a vehicle light having an emission surface oriented with reference to a main beam direction, on which surface at least one formed-on part is disposed, which deflects light from a base light source perpendicular to the main beam direction, into a lateral emission direction, the most directed emission possible can be brought about while having an attractively shaped and most uniform emission surface possible, if the emission surface has a region that extends in the lateral emission direction and a region that extends perpendicular to the lateral emission direction, and if the formed-on part is disposed in the region that extends in the lateral emission direction. Placement of the formed-on part in the region that extends in the lateral emission direction makes it possible to configure the formed-on part to be longer in the lateral emission direction, because by its nature, more emission surface is available in this direction in this region than in the other region. In this way, the formed-on part can be configured to be more effective and to emit more light in the lateral emission direction.

As was already indicated above, the vehicle light can provide a combination of types of vehicle lights. In particular, a daytime running light, position light, side marker light, brake light, parking light, turn signal light, taillight, high beam light, and dimmed headlight can be implemented in the vehicle light.

Possibilities for corresponding implementation are the base light source, possible supplemental light sources, and possible attachment light sources. In this regard, it is advantageous if the type of vehicle light that is weaker in terms of light is provided by means of the base light source, and the type of vehicle light that is stronger or demands a larger emission surface is provided by way of the supplemental light source and/or the attachment light source. Thus, it is possible, for example, to implement a yellow side marker light by way of the base light source, and a turn signal light, which is also yellow, by way of the attachment light source or by means of multiple supplemental light sources. The same holds true for simultaneous implementation of a daytime running light by way of the base light source and a dimmed headlight or high beam by way of the attachment light source, wherein—if necessary—the high beam can also be supplementally or alternatively implemented by way of supplemental light sources. Rear marker lights and a taillight can be implemented by way of the base light source and the attachment light source, respectively. In the case of such an embodiment, a brake light can be implemented with supplementation by a higher light output of the attachment light source and/or supplemental light source, for example. Likewise, it is, of course, possible to emit different colors by way of the different emission surfaces, something that appears to be particularly conceivable with regard to a side marker light or position light and a turn signal light or with regard to a taillight or brake light and a turn signal light. In itself, no limits of any kind are set for the combinations in this regard, wherein extremely compact arrangements having an offset emission surface, which emits in as light-intensive, uniform, and directed a manner as possible, or which is illuminated from behind, can be constituted by means of the embodiments described above, if these are suitably combined and implemented.

The vehicle light can particularly be used as a motorcycle light or bicycle light, or also for quads, because—as was explained above—it has a particularly compact construction. If necessary, for this purpose a suitable holder can also be provided on a corresponding housing, which allows installation, particularly subsequent installation, on a motorcycle or bicycle. Particularly for use in connection with a dimmed headlight or high beam, however, fixed installation on the motorcycle will be advantageous, because here, extremely precise orientation of the emitted light appears practical. Nevertheless, a correspondingly compact arrangement proves to be advantageous in these cases, as well, particularly also if relatively large vehicle lights appear necessary in the case of a dimmed headlight or high beam, because it continues to be extremely important in the case of motorcycles, in general, to configure the lights in as small and compact a manner as possible.

Likewise, the light described here can be used not just as a vehicle light or motor vehicle light, but also for other purposes. Thus, for example, lettering or a logo, or an edging used for them, can be lighted from behind, accordingly, using a base light source. Likewise, spotlights, for example, can be implemented with different light sources in this manner, in that the one light source is used as a base light source, if necessary with one or more supplemental light sources, and the other light source is used as an attachment light source. Other approaches, such as, for example, a makeup mirror, which is supposed to be surrounded by as uniform a ring of lights as possible, or a camera flash with two different types of light sources, or a designer combination as a loudspeaker or microphone and light, wherein the loudspeaker or the microphone is disposed in the attachment construction space and the base light source, if necessary with supplemental light sources, can be used for the light, can be implemented in this manner. Accordingly, all the embodiments described as vehicle lights or motor vehicle lights here can also be used as lights.

It is understood that the characteristics of the solutions described above and in the claims can also be combined, if necessary, in order to be able to implement the advantages cumulatively, accordingly.

BRIEF DESCRIPTION OF THE DRAWINGS

Further advantages, goals, and properties of the present invention will be explained using the following description of exemplary embodiments, which are particularly also shown in the attached drawing. The drawing shows.

DETAILED DESCRIPTION OF PREFERRED EMBODIMENTS

Figure 1:
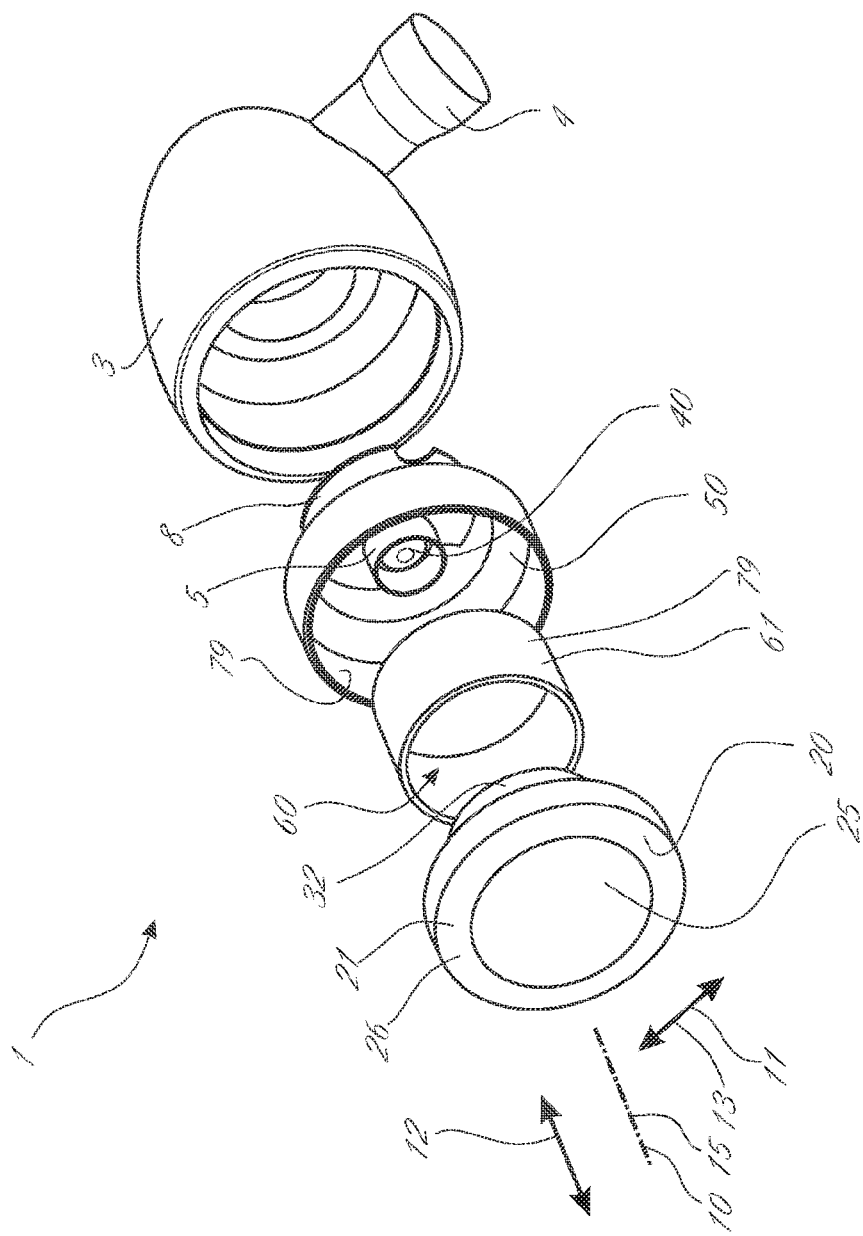
FIG. 1 a schematic exploded view of a vehicle light.

The vehicle lights 1 shown in the figures comprise a housing 3, in each instance, having a holder or holding arm 4 that projects away from the housing 3, by means of which arm the housing 3 can be attached to a motorcycle, to a bicycle or to another vehicle. Any supplies lines that might be necessary, such as cables and the like, are also conducted into the housing by means of the holder arm 4. It is understood that in deviating embodiments, the housing 3 can have a different shape and, in particular, a differently configured attachment device.

Except for the holder arm 4, the housing 3 is essentially configured with rotation symmetry with reference to a symmetry axis, which defines a main beam direction 10 of the vehicle light 1.

The housing 3 is closed off in the direction of the main beam direction 10 by means of a body 21, 26, which constitutes emission surfaces 20, 25 for light sources 30, 31, 32 that are disposed in the housing 3.

Thus, a base light source 30 (see FIGS. 2 to 5) and an attachment light source 32 (merely shown schematically in FIG. 1) are disposed in the housing 3.

Figure 7:
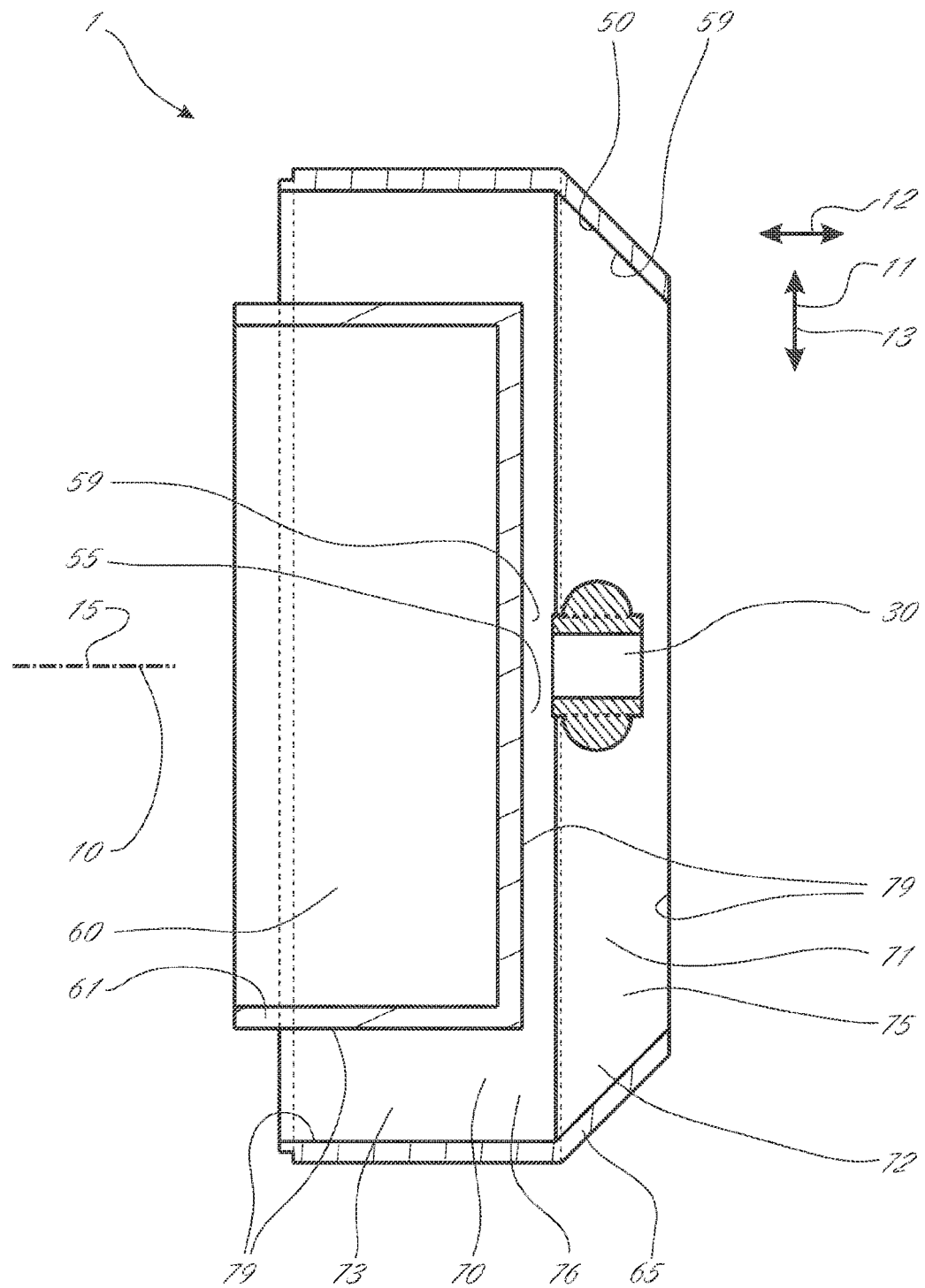

In this regard, the base light source 30 is mounted in the housing and held in position by a support plate 8 (not shown in FIGS. 7 and 8), on which the related electronics are also provided. In all the present exemplary embodiments, the base light source 30 is configured as a light-emitting diode, with it being understood that here—depending on the concrete implementation—other light sources can easily be used, as well.

As is particularly evident from FIGS. 2 to 6, a light guide body 40 that surrounds the base light source 30 is disposed on the base light source 30 (see also FIG. 1).

Figure 2:
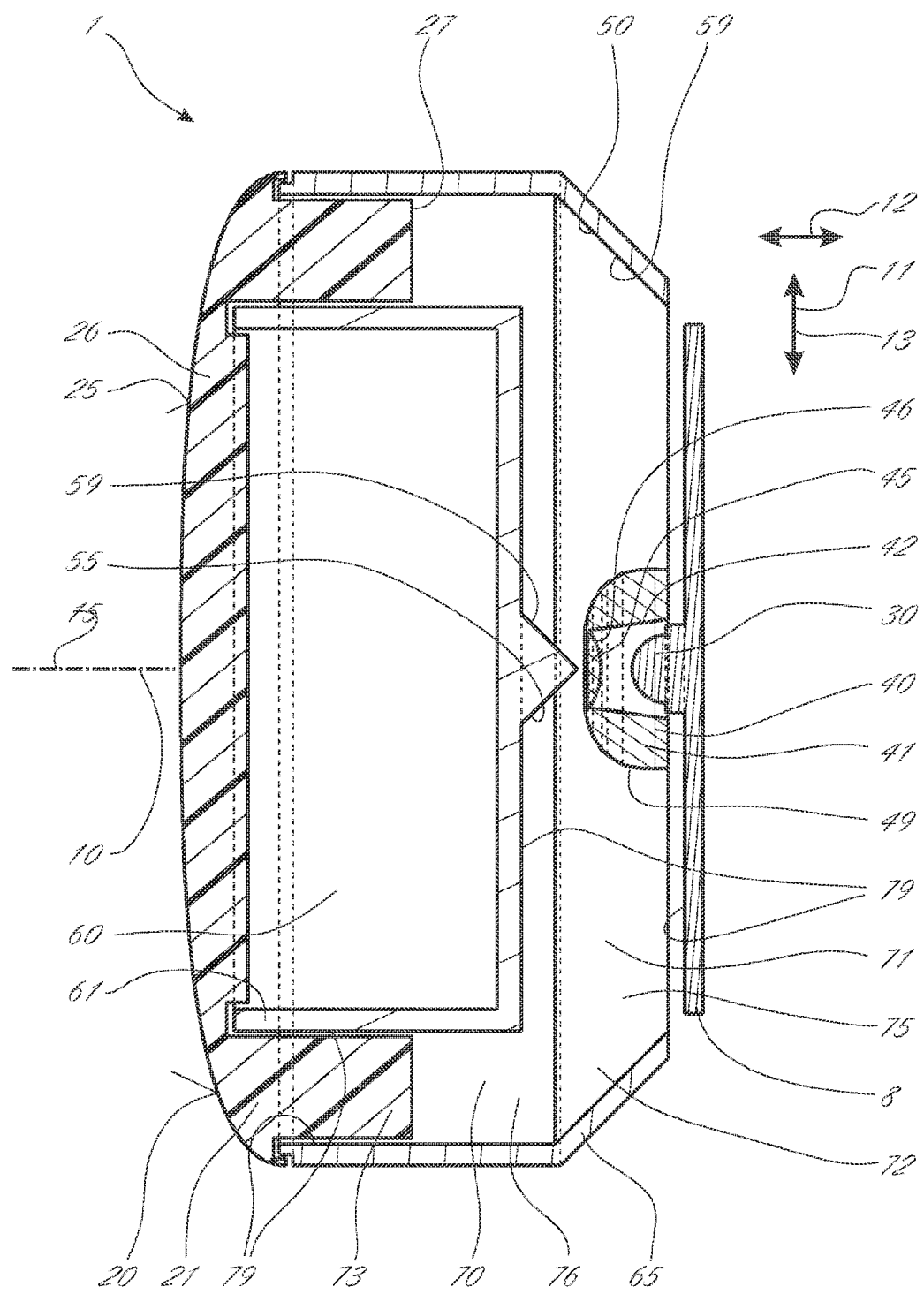
FIG. 2 an example of optics for the vehicle light according to FIG. 1, in section through a symmetry axis according to FIG. 1, FIG. 3 a second optical arrangement for the vehicle light according to FIG. 1, in section through the symmetry axis according to FIG. 1, FIG. 4 a third optical arrangement for a vehicle light similar to the vehicle light according to FIG. 1, in section through the symmetry axis according to FIG. 1, FIG. 5 a fourth optical arrangement for the vehicle light according to FIG. 1, in section through the symmetry axis according to FIG. 1, FIG. 6 a fifth optical arrangement for the vehicle light according to FIG. 1, in section through the symmetry axis according to FIG. 1, FIG. 7 a sixth optical arrangement for the vehicle light according to FIG. 1, in section through the symmetry axis according to FIG. 1, FIG. 8 a detail of a body having the emission surface, with an optically active light entry surface.
Figure 3:
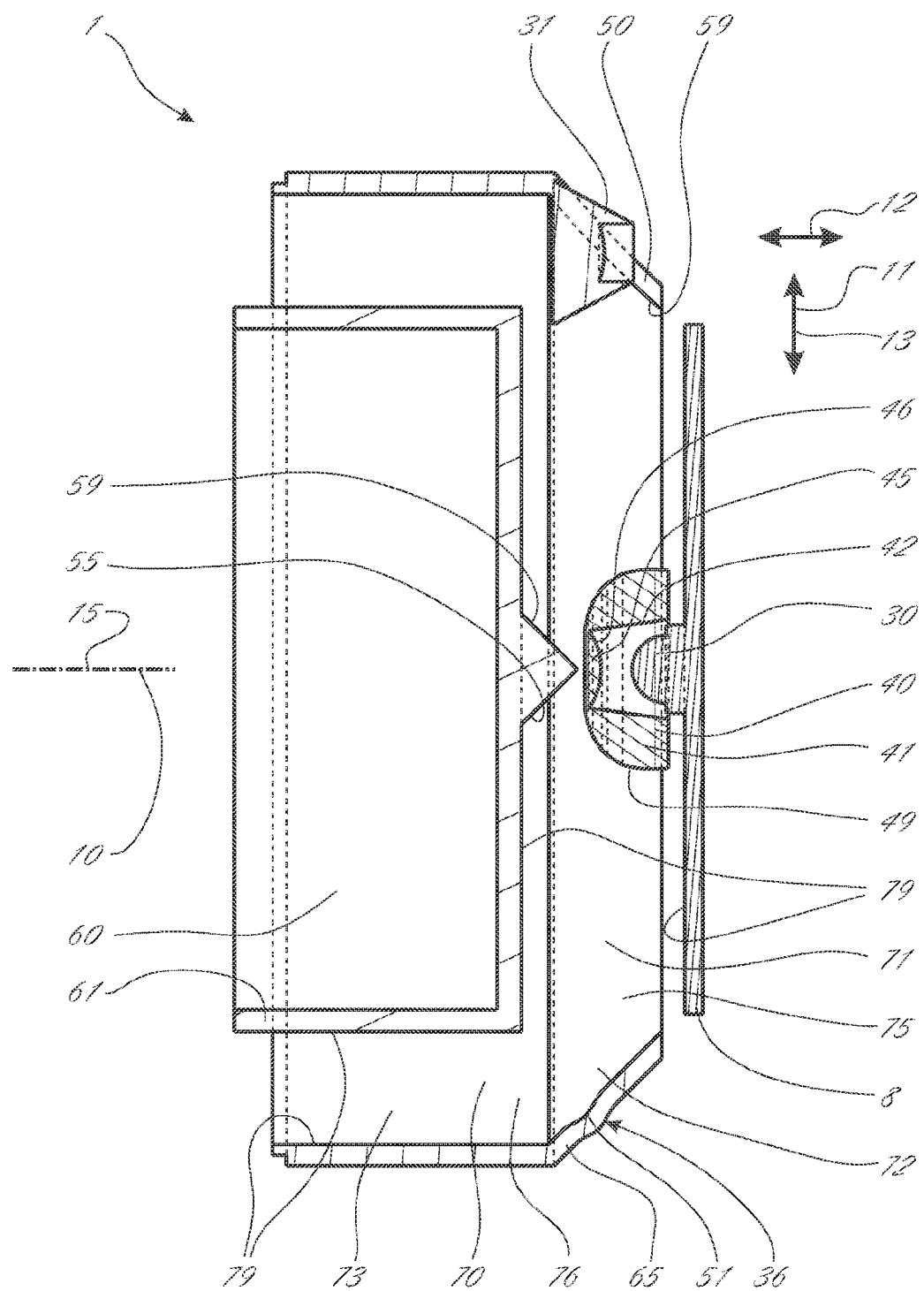
Figure 4:
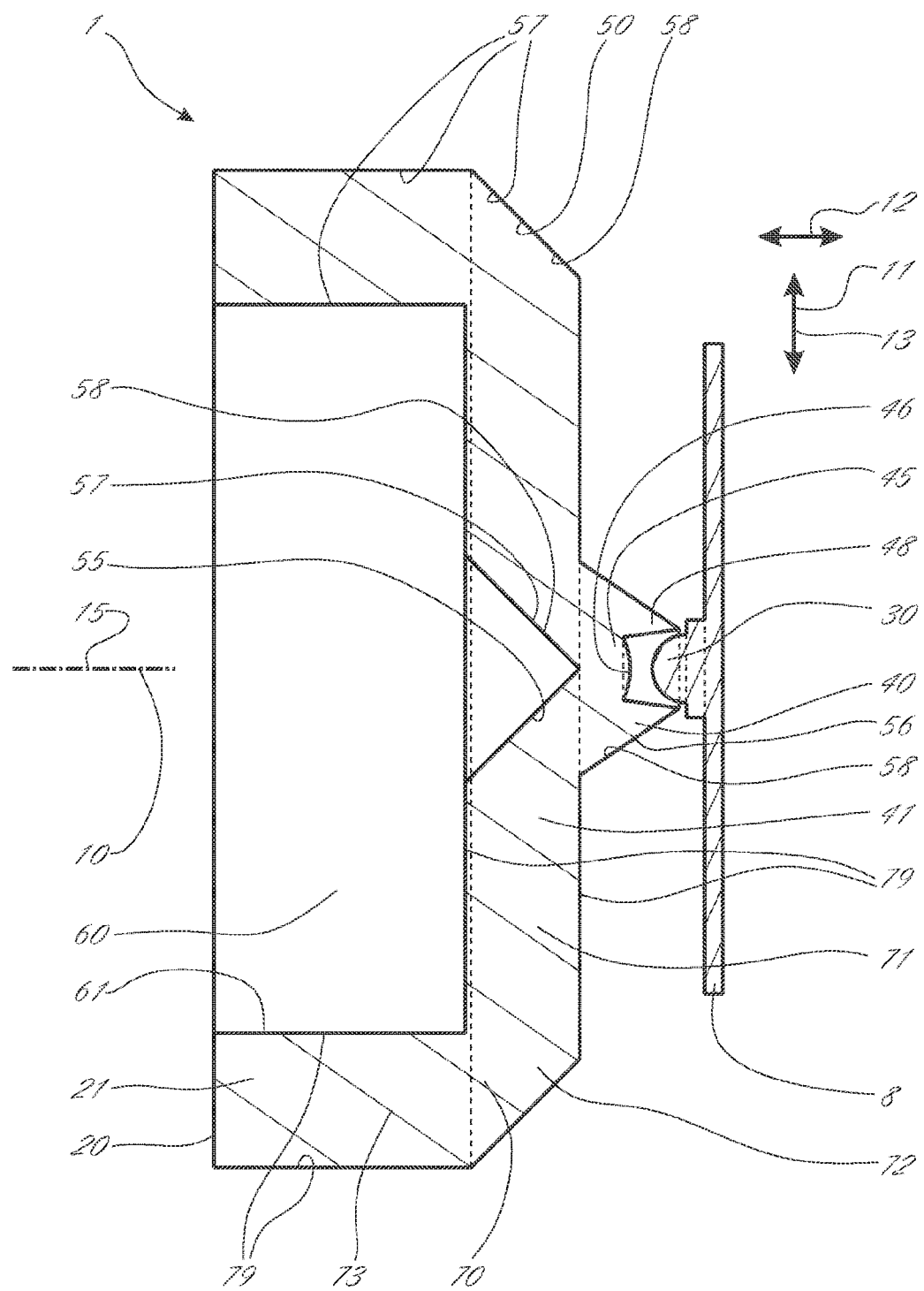
Figure 5:
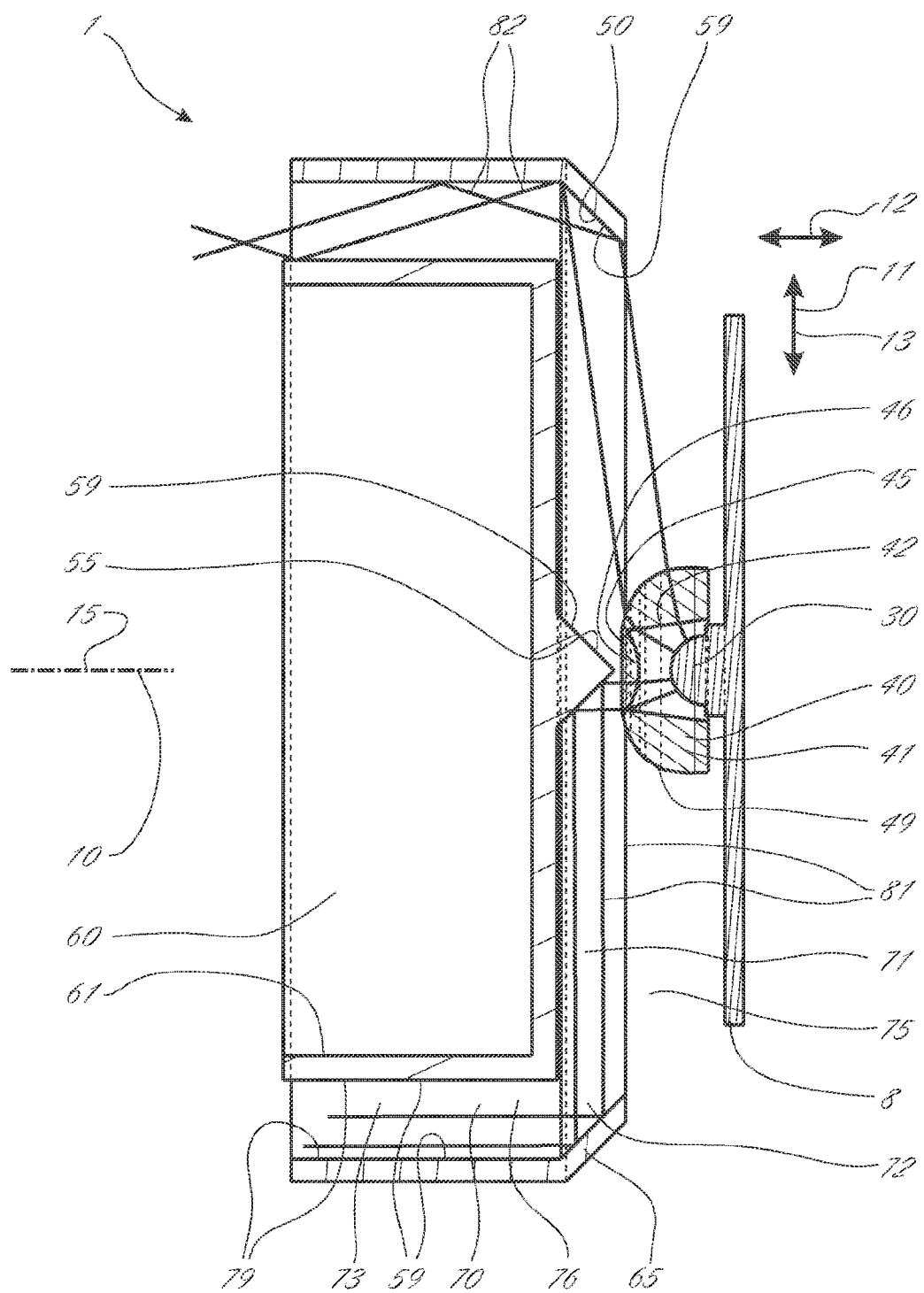
Figure 6:
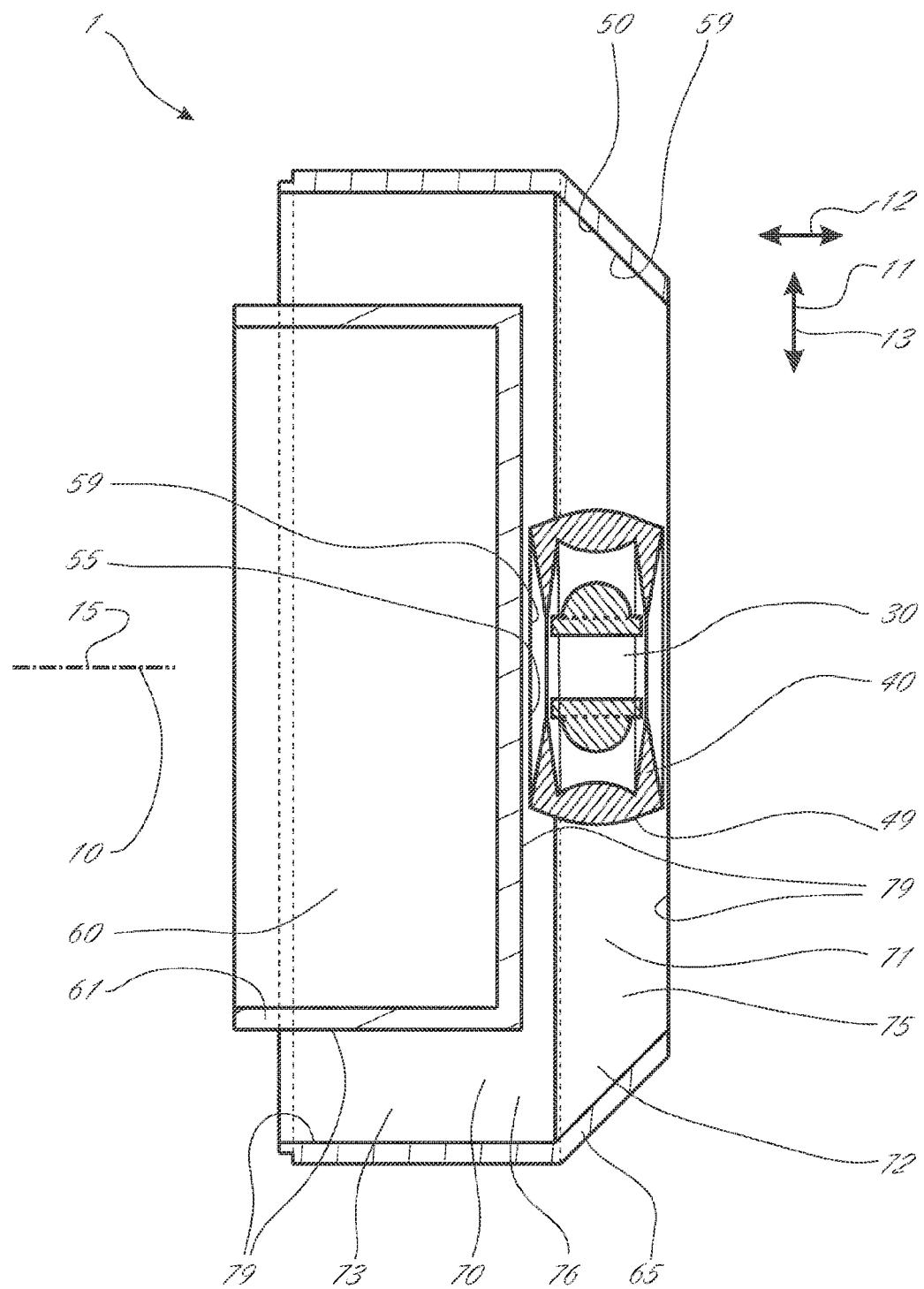

In the present exemplary embodiments according to FIGS. 2, 3, and 5, a spacer 5 is disposed around the light guide body 40 (see FIG. 1), which spacer as such is essentially inactive optically, so that it is not shown in the sections according to FIGS. 2, 3, and 5 (these figures essentially serve to constitute the optically active elements). In the exemplary embodiment shown in FIG. 4, in contrast, the function of the spacer is fulfilled by the light guide body 40 itself, while in the exemplary embodiments shown in FIGS. 6 and 7, the base light source 30 is used as a spacer.

Seen in the main beam direction 10, an attachment construction space 60 is provided behind the spacer 5 or behind the light guide body 40, which space is delimited by a pot-shaped wall 61 having an essentially level bottom and an essentially cylindrical wall surface. Any desired modules can be accommodated in the attachment construction space 60; in the present exemplary embodiments, the attachment light source 32 with its related modules is disposed there.

The attachment construction space 60 is closed off, in the direction of the main beam direction 10, by means of a body 26 that has the attachment light source emission surface 25, by means of which the light of the attachment light source 32 can leave the vehicle light 1.

An essentially rotation-symmetrical mantle body 65 having a cylindrical mantle surface and a mantle surface in the form of a truncated cone provided counter to the main beam direction 10 is provided radially on the outside around the arrangement composed of base light source 30, light guide body 40, and—if applicable—spacer 5 as well as the attachment construction space 60, in the exemplary embodiments shown in FIGS. 2, 3, and 5 to 7, wherein in this way, a wall 79 of a light guide space 70 is constituted, which space is furthermore delimited by the wall 61 of the attachment construction space 60, and wherein the part in the form of a truncated cone constitutes a passive reflector 50 for light proceeding from the base light source 30, as will still be explained in detail below.

The light guide space 70 is closed off, in the main beam direction 10, by a body 21 that has the emission surface 20, which body, in this exemplary embodiment, is configured in one piece with the body 26 having the attachment light source emission surface 25. The latter configuration results in significant simplification in installation and adjustment, and means that a small amount of light can get from one emission surface 20, 25 to the other emission surface 20, 25. In deviating embodiments, a multi-piece arrangement can be provided here. Likewise, it is conceivable to provide light-separating devices between the two emission surfaces 20, 25, which can possibly also be introduced into the corresponding bodies 21, 26 in one piece.

In the present exemplary embodiment, the emission surfaces 20, 25 make a flush transition into one another, but this is not compulsory—especially if separate bodies 21, 26 are used.

As is directly evident, the main beam direction 10 forms a central beam axis 15 in the present exemplary embodiment, which axis can easily be defined even in the case of elliptical base forms of the emission surfaces 20, 25. In this regard, the essentially rotation-symmetrical modules—despite lower symmetries being present here in the case of elliptical base surfaces or base surfaces having a different shape—are disposed axially 12 one behind the other along the main beam direction, wherein the emission surface 20 surrounds the attachment light source emission surface 25 radially 11 toward the outside, in ring shape. The other modules, as well, such as the modules that define the attachment construction space 60 and the modules that define the light guide space 70, as well as the light guide bodies 40 are disposed in accordance with these geometries. This particularly holds true also for the base light source 30, which emits axially 12 or toward the front in the main beam direction 10, in each instance, in these exemplary embodiments, and is disposed centrally on the central beam axis 15.

In detail, in the exemplary embodiment shown in FIG. 2, the base light source 30 disposed on the support plate 8 is surrounded by a light guide body 40 that in turn is spaced apart both from the passive reflector 50 and from a deflection mirror 55 that is formed out on the back of the wall 61 of the attachment construction space 60, wherein the distance between the deflection mirror 55 and the light guide body 40 is guaranteed by the spacer 5, not shown in FIG. 2.

The light guide space 70 delimited by the wall 61 and the mantle body 65 is an empty space 75, 76, with the exception of the light guide body 40 and the body 21, 26 that has the emission surfaces 20, 25 (only shown in FIG. 1), so that in the exemplary embodiment shown in FIG. 2, an empty space 75, 76 can be found, in each instance, between the light guide body 40 and the passive reflector 50, on the one hand, between the light guide body 40 and the deflection mirror 55, on the other hand, as well as between the body 21, 26 and the passive deflector 50.

In this exemplary embodiment, the light guide body 40 is divided into a radially active light guide body 41 that deflects a major portion of the light that leaves the base light source 30 laterally 13 or radially 11 in the radial 11 direction, with a radial coupling region 42, in other words parallelizes it with reference to a radially 11 or laterally 13 oriented plane, parallel to this plane, in other words comes close in the inclination direction of this plane.

Furthermore, the light guide body 40 comprises an axially active light guide body having an axial coupling region 46, which parallelizes or focuses light that leaves the base light source 30 with an essentially axial 12 component, in the axial direction 12. It is understood that parallelization does not necessarily have to lead entirely to parallel light beams. This is excluded for purely physical reasons right from the start, in view of the spatial expanse of the base light source 30. What is essential is that the light is given a stronger parallel direction component than before during a parallelization process, and thereby is directed more parallel than before.

The light guide body 40 furthermore has a coupling region 49, which deflects light beams that run radially in the light guide body 40 even further in the radial 11 direction, in order to further reinforce the parallelization of these light beams.

The light guide body 40 also has an axial decoupling region, which is not numbered for the sake of clarity, which region, however, only refracts the light insignificantly in the present exemplary embodiment, and forms the corresponding light bundle, because it was already possible to implement this, in the present exemplary embodiment, by means of the axial coupling region 46, to an outstanding extent. It is understood that in the case of other embodiments, this axial decoupling region can also be used in essentially parallelizing or focusing manner.

The light that leaves the light guide body 40 radially 11 gets to a deflection region 72, in which the passive reflector 50 is disposed, by means of the light guide space 71 that constitutes the radial part of the light guide space 70, and is guided axially 12 outward there by means of the light guide space 73, which constitutes the axial 12 region of the light guide space 70. There, the light can accordingly reach the emission surface 20, in that it penetrates into this surface by means of a light entry surface 27 of the body 21, which therefore also acts as a light guide body.

The light that leaves the light guide body 40 essentially axially 12, in contrast, is first reflected in the radial direction by the deflection mirror 55, and then passes through the same light guide space 70 as the light that leaves the light guide body 40 radially, in corresponding manner.

In the present exemplary embodiment, it is provided that both the light beams that leave the light guide body 40 axially 12 and those that leave it radially 11 are emitted onto the passive reflector 50, directed essentially radially 11, so that these light beams do not intersect or touch one another, or do so only to a very slight degree. This brings about the result that accordingly, the light beams also leave the passive reflector 50 in parallel manner, and reach the emission surface 20 and can be emitted from there in correspondingly directed manner.

In deviating embodiments, intersecting light paths can also be provided, something that accordingly leads to light beams that leave the light guide space 73 at an angle as compared with the main beam direction 10. Thus, it is possible, for example, to allow the light beams that leave the deflection mirror 55 to run essentially parallel to the radial 11 direction, so that ultimately, they are also emitted essentially parallel along the main beam direction 10 or along the central beam axis 15, while the light beams that leave the light guide body 40 essentially radially 11 are emitted so as to be distributed over the entire passive reflector 50, so that only the light beams that run essentially radially 11 are also emitted parallel to the main beam direction or to the central beam axis 15, while the light beams that run through the light guide space 71 with an axial 12 component then, accordingly, also run through the light guide space 73 in the axial direction with a radial 11 component, and get to the emission surface 20 at a corresponding angle, and are also passed on optically accordingly. The latter solution ultimately reflects the actual conditions at the base light source 30, in which the light emitted laterally 13, as such, radiates to the side, at least in large part, and frequently cannot be parallelized entirely, even in the case of direct emission. In this regard, the optical emission field of the vehicle light 1 can be influenced in desired manner with reference to the base light source 30 in this way, and can be adapted to existing requirements, such as statutory conditions, for example.

In the exemplary embodiment shown in FIG. 2, the walls of the wall 61 of the attachment construction space 60 that face the light guide space 70, as well as the inside of the mantle body 65, are configured as a mirrored wall 59. In this way, scattered light or diffuse light can also be passed on as background radiation, at least to a great extent. This effect can be further increased if a mirrored surface or a mirrored wall is provided between the support plate 8 and the light guide space 70, which surface or wall, however, does not appear necessary in the present exemplary embodiment, because of the required amount of light.

Not shown in FIG. 2 are feed lines and the spacer 5, which penetrate the light guide space 70 or are disposed within the light guide space 70. Because the spacer 5 as such is optically inactive, it is not shown in FIG. 2 here. The ducts for the electrical lines and other smaller components influence the optical overall appearance and the beam paths insignificantly and merely at small angles, so that these can be ignored in the present case.

The exemplary embodiment shown in FIG. 3 essentially corresponds to the exemplary embodiment according to FIG. 2. However, supplemental light sources 31 are also disposed in the light guide space 70, which radiate directly axially through the light guide space 73 onto the emission surface 20. By means of these supplemental light sources 31, it is possible to significantly increase the light output of the light emitted at the emission surface 20 for specific operating states, for example for the case of constituting a brake light. As is directly evident, this amplification does not take place with the uniformity with which the light of the base light source 30 is emitted, but in view of the brightness emitted as a whole and in view of the relatively short radiation times, this can be considered tolerable in this exemplary embodiment. Also, the supplemental light sources 31, only one capture mirror and parallelizing light guide body of which are shown, interrupt the light guide space 70 in the region of the deflection region 72, so that in this way, variations in the uniformity of the light passed from the base light source 30 to the emission surface 20 are brought about. However, it has been shown that these variations are so slight that they only insignificantly impair the overall impression of the emitted light with regard to its intensity, its uniformity, and its direction.

In a modified embodiment, the supplemental light source 31 or—if multiple sources are provided—the supplemental light sources 31 can be disposed offset axially toward the rear (in other words toward the left in FIG. 3). If applicable, it is also conceivable to allow this light source to radiate radially 11 outward at first, and then to couple it into the light guide space 70 in the axial direction by way of mirrors.

Depending on the concrete implementation, within the scope of coupling of these supplemental light sources 31, the passive reflector 50 can be configured as a partially transmissible mirror, through which the light of the supplemental light source 31, shining through, can be coupled into the light guide space 71, in each instance, and at which the light that runs radially 11 in the light guide space 71 can still be reflected. In this way, the uniformity of the directed emission can be correspondingly increased.

The exemplary embodiment shown in FIG. 4 deviates from the exemplary embodiments according to FIGS. 2 and 3 particularly to the effect that the entire light guide space 70 is configured as a light guide body 40, which reaches from the coupling regions 42, 46 all the way to the emission surface 20. In this regard, slight structural measures are required in order to integrate the exemplary embodiment shown in FIG. 4 into the arrangement according to FIG. 1.

In particular, it is conceivable, in this exemplary embodiment, to do without mirrored walls 49, in the case of which the mirror prevents penetration into the mirrored surface and reflects the light away from the surface, because ultimately, the light in the light guide space 70 or in the light guide body 40 can be guided from the coupling regions 42, 46 all the way to the emission surface 20 by way of mirrored surfaces 57 of the light guide body 40, by means of which the light is reflected back into the light guide body, in each instance, or by means of boundary surface reflections 48, particularly by means of total reflections.

In particular, no separate wall 61 of the attachment construction space 60 as well as of a mantle body 65 is required, wherein it is certainly advantageous, in certain parts, to still provide housing components also at the attachment construction space 60. In particular, in such an embodiment, the attachment light source emission surface 25 will also have to be provided on a separate body. In an alternative, the emission surface 20 can also be provided separately from the light guide body 40, so that once again, a common body 21, 26 for the emission surfaces 20, 25 can be provided.

As is directly evident, light that leaves the base light source 30 with an essentially axial 12 direction component is radiated by way of the axial coupling region 46 in the exemplary embodiment according to FIG. 4, axially directed at the deflection mirror 55 that uses a mirrored surface 57 and a boundary surface reflection 58, and from there it is deflected radially 11 outward. In contrast, light of the base light source 30 that is emitted with an essentially lateral 13 component is coupled into the light guide body 40 in a lateral coupling region 48, wherein this lateral coupling region 48 refracts the light in the axial or in the radial direction, depending on the concrete embodiment, something that is ultimately connected with the reflection angle of a capture mirror 56, by means of which this light, which leaves the base light source 30 laterally 13, is reflected axially 12 onto the deflection mirror 55. From this, this light also follows the light guide body 40 through the light guide space 71 all the way to the deflection region 72, in which a passive reflector 50 is provided by means of a mirrored surface 57 as well as by means of boundary surface reflection 58.

Both the light that leaves the base light source 30 axially 12 and the light that leaves it radially 11 are reflected in the axial 12 direction and passed on, in directed manner, within the light guide body 40, through the light guide space 73, onto the emission surface 20.

It is understood that in deviating embodiments, a combination of mirrored surfaces 57 and boundary surface reflection 58 can be left out, if one of the effects reflects the light in sufficiently stable manner. This is ultimately particularly dependent on the required light output. It is understood that light from supplemental light sources can easily be coupled into the light guide body 40 of the exemplary embodiment according to FIG. 4, as well, something that can take place particularly by way of the passive reflectors 50, but, if applicable, also by way of the deflection mirror 55 or even by way of the capture mirror 56. The latter can also be implemented in the other exemplary embodiments, under some circumstances.

The exemplary embodiment shown in FIG. 5 essentially corresponds to the exemplary embodiment according to FIG. 2, wherein here, the passive reflector 50 is configured to be significantly shorter in the axial 12 direction. This has the result that light beams 81 reflected by the deflection mirror 55 essentially parallel to the radial 11 direction reach the emission surface 20 in a straight line and in very directed manner, while the light that leaves the radially active light guide body 41 or the light guide body 40 essentially radially 11, which is shown as light beams 82 as an example, has a certain axial 12 component all the way to the passive reflector 50, in order to get to the passive reflector 50. This has the result that it also gets through the light guide space 73 at a corresponding angle, and therefore also reaches the emission surface 20 at a corresponding angle. In a deviating embodiment, these conditions could also be reversed, in that the passive reflector 50 is oriented differently, for example. As was already explained using the exemplary embodiment according to FIG. 2, this leads to a somewhat widened light field, but under some circumstances, this could actually be desirable, in order to thereby fulfill other requirements, for example requirements of law.

As is directly evident, in the exemplary embodiments according to FIGS. 2 to 5, the radially active light guide body 41 and the axially active light guide body 45 are configured in one piece as a light guide body 40.

Furthermore, the radial expanse of the passive reflector 50 in the exemplary embodiments according to FIGS. 2 to 4 corresponds to the radial expanse of the emission surface 20. This is different in the exemplary embodiment according to FIG. 5, something that would ultimately make it possible to configure the light guide space 73 as well as the emission surface 20 to be even narrower, so that here, once again, correspondence would be present.

Likewise, it is conceivable that the decoupling surface 49 of the light guide body 40 in the exemplary embodiment according to FIG. 5 is active in axially refractive manner in its region that lies next to the base light source 30, in order to also guide lateral light to the passive reflector 50 or into the light guide space 73. This can also be advantageous in the exemplary embodiments according to FIGS. 2 and 3, if applicable.

As is directly evident, the light guide space 70 is relatively small in all the exemplary embodiments, so that the axial expanse, in particular, of the light guide space that extends radially with reference to the main beam direction 10, all the way to the deflection region 72, is smaller than its radial expanse. Likewise, the radial expanse of the light guide space 73 that extends axially with reference to the main beam direction, all the way to the emission surface 20, is smaller that its axial expanse.

In all the exemplary embodiments according to FIGS. 2 to 5, the base light source 30 is a single light source, which is disposed centrally axially 12 along the main beam direction 10 or along the central beam axis 15, on this central beam axis 15. This is different in the exemplary embodiments according to FIGS. 6 and 7, in which the base light source 30 is formed from multiple light sources, which are directed radially 11 outward in these exemplary embodiments, wherein in other exemplary embodiments, if applicable, a different orientation coupled with further optical measures can also be provided. However, the base light source 30 is also disposed centrally on the central beam axis 15 in the exemplary embodiments according to FIGS. 6 and 7.

It is understood that in deviating embodiments, the base light source 30 of the exemplary embodiments according to FIGS. 1 to 5 and the deflection mirror 55 can be interchanged, so that the base light source 30—and, in particular, also the support plate 8, if applicable—is disposed on the wall 61 of the attachment construction space 60 or in the main beam direction 10 behind the light guide space 71. It can then radiate laterally, as in the exemplary embodiments according to FIGS. 6 and 7, or counter to the main beam direction 10 or away from the attachment construction space, wherein in the latter case, the emitted light can then be deflected, for example by means of a deflection mirror that is disposed in the main beam direction 10 in front of the light guide space 71 or opposite the wall 61 of the attachment construction space 60, and/or laterally onto the passive reflector 50, by way of corresponding light guide bodies, in order to then be reflected parallel to the main beam direction 10.

In all the exemplary embodiments, the emission surface 20 is also oriented in ring shape around the central beam axis. It is understood that with regard to this arrangement and symmetry, deviations are possible in other embodiments, if, for example, elliptical emission surfaces or other deviations from the ring shape are desired.

The light guide bodies 40, 41, 45 of the exemplary embodiments according to FIGS. 2 to 6 are also disposed centrally on the central beam axis 15 and correspond to the desired symmetry, something that applies accordingly also for the bodies 21, 26, which have the emission surfaces 20, 25. In the exemplary embodiment according to FIG. 6, the light guide body 30 does not serve only for radial 11 orientation of the light proceeding from the base light source 30, but also for uniformization of the light field proceeding from the base light source in the circumferential direction around the main axis 10. In the exemplary embodiment shown in FIG. 7, there is no light guide body 40, since it was shown that if applicable, if there are a sufficiently high number of light sources, particularly of micro-LEDs with high light output, a base light source 30 that is sufficiently bright and is uniform in terms of its homogeneity can be provided.

This homogeneity can lead to the result that very bright regions occur in the main beam direction, something that might need to be avoided. For this purpose, in the exemplary embodiments shown in FIGS. 6 and 7, for example, the light sources can be oriented so that they do not proceed precisely radially from the main beam direction 10 or from the central beam axis 15, but rather in offset manner. Likewise, supplemental optical devices, such as optically active formed-on parts on mirrors, or convex or concave embodiments of the mirrors, or light entry or exit surfaces of light-conductive bodies can also be provided for this purpose. Thus, for example, the passive reflector 50 of the exemplary embodiment according to FIG. 3 has a focusing region 51 as a manipulation means 36 for manipulation of the light between the base light source 30 and the emission surface 20, which focuses light before it exits from the emission surface 20, so that this light leaves the emission surface with a wide emission cone.

Figure 8:
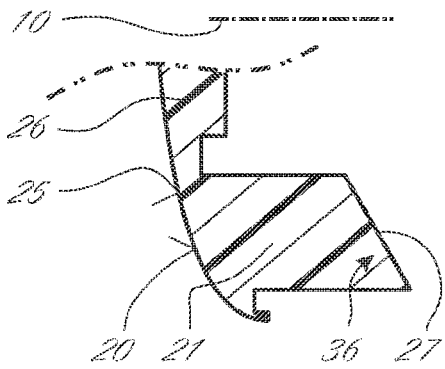
Figure 9:
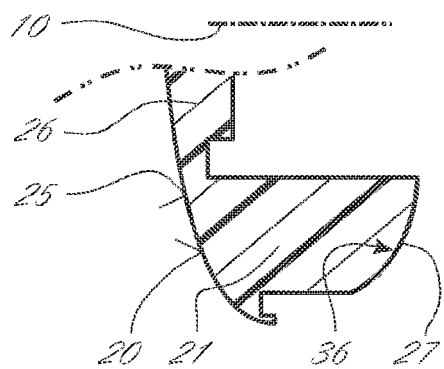
FIG. 9 a detail of a further body having the emission surface, with an optically active light entry surface.
Figure 10:
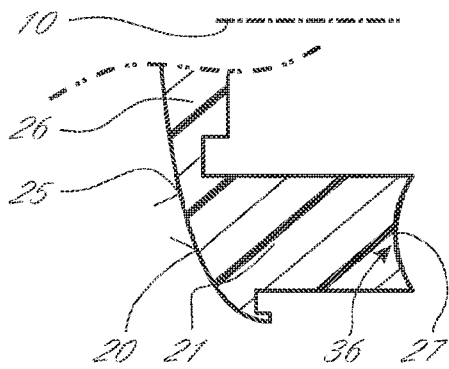
FIG. 10 a detail of a further body having the emission surface, with an optically active light entry surface.
Figure 11:
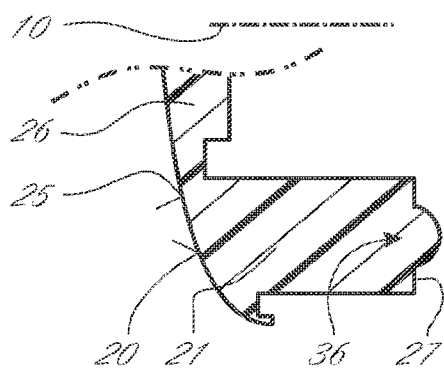
FIG. 11 a detail of a further body having the emission surface, with an optically active light entry surface.

It is understood that alternatively, other manipulation means 36, such as, for example, corresponding optically manipulating light entry surfaces 27 of the body 21 that has the emission surface 20 or also of the light guide body 40 and its light exit surfaces can be used accordingly, as is shown as an example using the light exit surfaces 27 shown in FIGS. 8 to 11, which surfaces are configured merely at a slant in the exemplary embodiment shown in FIG. 8, at a slant and convex in the exemplary embodiment shown in FIG. 9, concave in the exemplary embodiment shown in FIG. 10, and with a small convex region in the one in FIG. 11. The first two embodiments lead to manipulation of the direction of the emission cone in the plane of the drawing, which corresponds to a section through the main beam direction 10 and the respective light exit point, while the latter three embodiments change the cone angle in this plane. In this regard, as in the focusing region 51 of the passive reflector 50 according to FIG. 3, the focus of the small convex region according to FIG. 11 is still in front of the emission surface 20, so that the light leaves the vehicle light 1 in correspondingly fanned manner.

Figure 12:
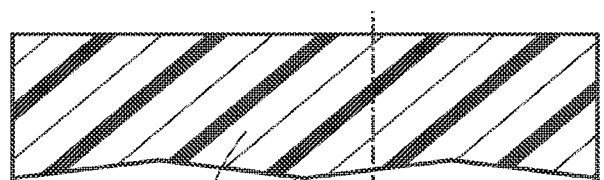
FIG. 12 a detail of the optically active body according to FIG. 11, in a section in the circumference direction around the main beam direction.
Figure 13:
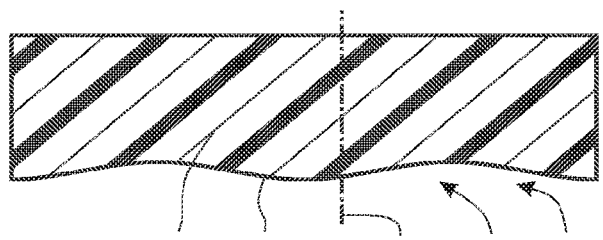
FIG. 13 a detail of another optically active body, in a representation similar to FIG. 12.

In other embodiments, variation means 35 can be provided, which vary corresponding manipulations as a function of the circumference position around the main beam direction 10. Depending on the concrete implementation, these variations means 35 can vary the emission angle and/or the emission direction locally in accordance with the above exemplary embodiments, in that the corresponding configurations take place to a stronger or weaker degree. Also, the emission direction can be varied, in terms of its angle, with reference to the plane of the drawing used in FIGS. 8 to 11, in that the light entry surface 27 of the body 21 that has the emission surface 20 is configured with inclined surfaces (see FIG. 12) or in sine-like manner (see FIG. 13). This then leads to a corresponding inclination of the light that is passed on. It is understood that corresponding measures can also be provided on the mirrors 50 and 55 or on the light guide body 40, in that a deviation occurs from a rotation symmetry about the main beam direction 10 or from a symmetry about the main beam direction 10 that corresponds to the housing 3.

Figure 14:
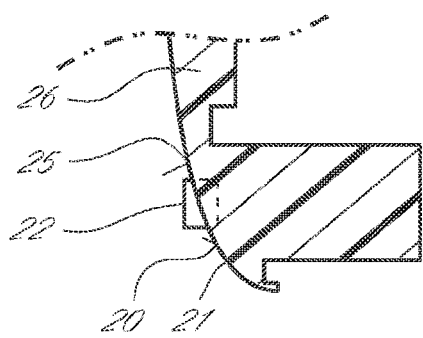
FIG. 14 a detail of a further body having the emission surface, with a formed-on part.
Figure 15:
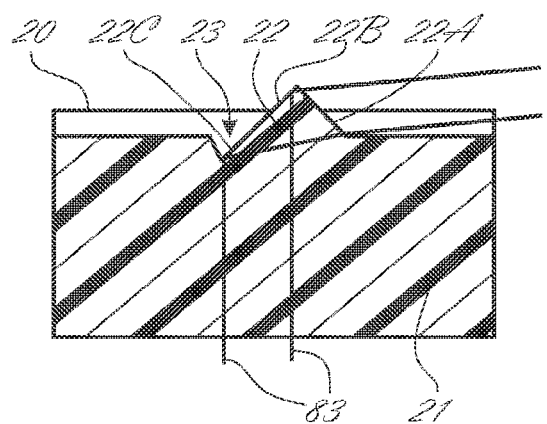
FIG. 15 a detail of the optically active body according to FIG. 14, in a section in the circumference direction around the main beam direction.
Figure 16:
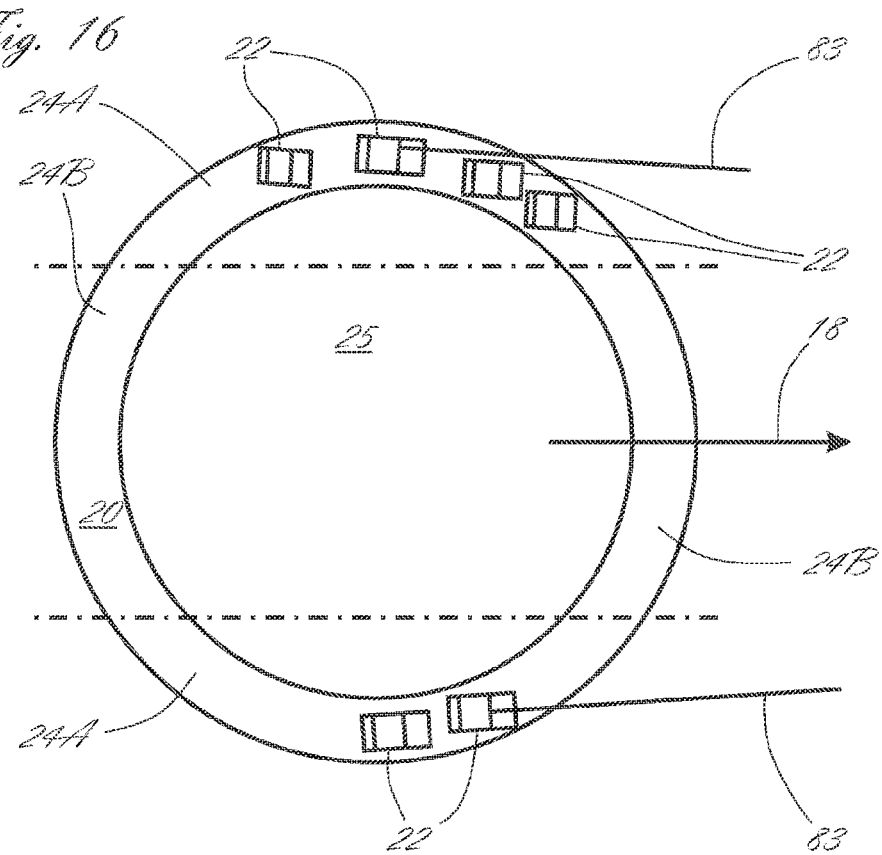
FIG. 16 a top view of the optically active body according to FIGS. 14 and 15.

Particularly in the case of very weakly curved emission surfaces 20 or those that are essentially countersunk into the housing 3, the visibility of the vehicle light 1 from the side might be insufficient. For this purpose, formed-on parts 22 can be provided on the emission surface 20, as shown as an example in FIGS. 14 to 16. One formed-on part 22 might already be enough to guarantee sufficient visibility from the side.

These formed-on parts 22 are configured in such a manner that light beams 83 are deflected in a lateral direction 18 by them, wherein these light beams have the greatest possible angle with reference to the main beam direction 10, for example up to 80°. In order to achieve this with the least possible projection above the emission surface 20, in the exemplary embodiment shown in FIGS. 14 to 16 the formed-on parts 22 are recessed into the emission surface 20, in part, and comprise a recess 23 in the body 21 that has the emission surface 20. In this way, one of the surfaces 22A, 22B, and 22C of the formed-on part 22, specifically the surface 22C, is an edge of the recess 23, wherein light beams 83 that are reflected there just reach the surface 22A and can exit there. This guarantees maximal light yield at a minimal expanse of the formed-on part 22 beyond the emission surface 20.

The formed-on parts 22 can be configured to be as long as possible in the lateral emission direction 18, if they are disposed in regions 24A of the emission surface 20 that extend in the lateral emission direction 18, because there, significantly more surface area is available in the lateral emission direction 18 than in regions 24B that extend perpendicular to the lateral emission direction 18. It is understood that these advantages can be found in emission surfaces 20 that have a different geometrical shape, as well.

Figure 17:
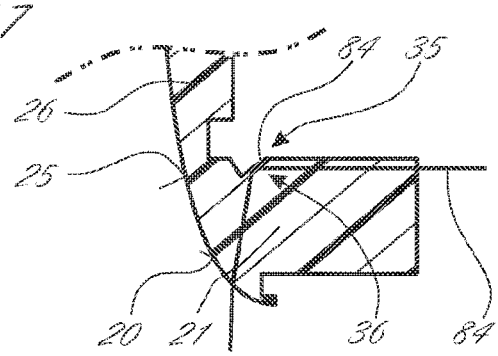
FIG. 17 a detail of a further body having the emission surface, with an optically active light entry surface.

In place of the formed-on parts 22, other measures can also be provided in order to achieve sufficient visibility from the side. This, for example, as shown as an example in FIG. 17, manipulation means 36 can be provided, which bring this about. As an example, the manipulation means 36 can comprise a totally reflective region 28, which guides a desired amount of light to the side, wherein—in the case of a suitable configuration—the emission surface 20, with its refractive properties that occur by their nature when the light leaves the body that has the emission surface 20, can also be used for corresponding orientation of this light emitted to the side, as shown as an example in FIG. 17. It is understood that other optical measures, such as mirrors or the like, can also be provided accordingly. Likewise, it can be desirable that the lateral emission varies over the circumference and is supposed to be present only in the horizontal direction, for example. It is then advantageous to provided the totally reflecting region(s) 28 as variation means that have changing optical properties, or only locally.

It is understood that the optical arrangements of FIGS. 2 to 7 can also be introduced or installed in other housing shapes and types than what is shown in FIG. 1.

The vehicle light 1 can particularly be used as a motorcycle light or bicycle light. On the other hand, of course, it can also be used in other vehicles, particularly as an attachment light, for which purpose the holding arm 4 offers the greatest possible flexibility, wherein it is understood that instead of the holding arm 4, other holders, such as holding clamps or articulated couplings, can be used.

Furthermore, it is understood that different types of vehicle lights, such as a daytime running light, position light, side marker light, brake light, parking light, turn signal light, taillight, high beam light, and dimmed headlight can be implemented by way of the different light sources 30, 31, 32. Here, it is recommended to take the desired light output and the desired optical effects into consideration accordingly, in order to make a decision as to which of the light sources 30, 31, 32 is to be used for which functions.

REFERENCE SYMBOL LIST 1 vehicle light
3 housing
4 holding arm
5 spacer
8 support plate
10 main beam direction
11 radial(ly)
12 axial(ly)
13 lateral(ly)
15 central beam axis
18 lateral emission direction
20 emission surface
21 body having the emission surface 20
22 formed-on part
22A surface of the formed-on part 22
22B surface of the formed-on part 22
22C surface of the formed-on part 22
23 recess
24A region extending in the lateral emission direction 18
24B region extending perpendicular to the lateral emission direction 18
25 attachment light source emission surface
26 body having the attachment light source emission surface 25
27 light entry surface
28 total reflective region
30 basic light source
31 supplemental light source
32 attachment light source
35 variation means
36 manipulation means
40 light guide body
41 radially active light guide body
42 radial coupling region
45 axially active light guide body
46 axial coupling region
48 lateral coupling region
49 decoupling region
50 passive reflector
51 focusing region
55 deflection mirror
56 capture mirror
57 mirrored surface
58 boundary surface reflection
59 mirrored wall
60 attachment construction space
61 wall of the attachment construction space 60
65 mantle body
70 light guide space
71 light guide space
72 deflection region
73 light guide space
75 empty space
76 empty space
79 wall of the light guide space 70
81 light beam
82 light beam
83 light beam
84 light beam

What is claimed is:

1. A vehicle light having an emission surface oriented with reference to a main beam direction, and having a base light source disposed behind the emission surface and offset with reference to the emission surface, wherein a radially active light guide body is disposed on the base light source, which body deflects light proceeding from the base light source radially with reference to the main beam direction, onto at least one passive reflector, which reflects the radially deflected light in the direction of the emission surface, and/or wherein an axially active light guide body is disposed on the base light source, which body deflects light proceeding from the base light source axially with reference to the main beam direction, onto at least one deflection mirror, which reflects the light in the radial direction, onto a passive reflector that reflects the radially deflected light in the direction of the emission surface, wherein at least one of the radially active light guide body and the axially active light guide body is disposed at a distance from the passive reflector, wherein an attachment construction space is disposed within the offset axially in front of the base light source, and wherein an attachment light source is disposed in said attachment construction space.

2. The vehicle light according to claim 1,
wherein the radially active light guide body has at least one radial coupling region, and
wherein coupled light proceeding from the base light source is radially refracted upon entry into the radial coupling region.

3. The vehicle light according to claim 1, wherein the deflection mirror and the passive reflector are spaced apart from one another.

4. The vehicle light according to claim 1, wherein the vehicle light comprises a combination of types of vehicle lights selected from the group consisting of a daytime running light, a position light, a side marker light, a brake light, a parking light, a turn signal light, a taillight, a high beam light, and a dimmed headlight.

5. The vehicle light according to claim 4,
wherein said combination of types comprises a first type of a vehicle light emitting weak light, and a second type of vehicle emitting strong light or requiring a large emission surface, and
wherein said first type is provided by the base light source and said second type is provided by way of the attachment light source.

6. The vehicle light according to claim 1, wherein a wall of the attachment construction space forms a wall of a light guide space or lies against one of the light guide bodies.

7. The vehicle light according to claim 1, wherein the vehicle light is a motorcycle light or a bicycle light.

8. A vehicle light
having an emission surface oriented with reference to a main beam direction, and
having a base light source disposed behind the emission surface (20) and offset with reference to the emission surface (20),
wherein between the base light source (30) and the emission surface (20), the light is first guided radially (11) outward, proceeding from the base light source (30), in a light guide space (70) that extends radially (11) with reference to the main beam direction (10) to a deflection region (72) and from there axially (12) with reference to the main beam direction (10) to the emission surface (20), and subsequently, in the deflection region (72), is deflected in a direction axial (12) with reference to the main beam direction (10), to the emission surface (20),
wherein an attachment construction space (60) is disposed within the offset axially (12) in front of the base light source (30), and
an attachment light source is disposed in said attachment constructions space.

9. The vehicle light according to claim 8, wherein an axial expanse of the light guide space that extends radially with reference to the main beam direction to the deflection region is smaller than a radial expanse of the light guide space.

10. The vehicle light according to claim 8, wherein a radial expanse of the light guide space that extends axially with reference to the main emission direction to the emission surface is smaller than an axial expanse of the light guide space.

11. The vehicle light according to claim 8, wherein the vehicle light comprises a combination of types of vehicle lights selected from the group consisting of a daytime running light, a position light, a side marker light, a brake light, a parking light, a turn signal light, a taillight, a high beam light, and a dimmed headlight.

12. The vehicle light according to claim 11, wherein said combination of types comprises a first type of a vehicle light emitting weak light, and a second type of vehicle emitting strong light or requiring a large emission surface, and wherein said first type is provided by the base light source and said second type is provided by way of the attachment light source.

13. The vehicle light according to claim 8, wherein a wall of the attachment construction space forms a wall of the light guide space or lies against one of the light guide bodies.

14. The vehicle light according to claim 8, wherein the vehicle light is a motorcycle light or a bicycle light.

15. A vehicle light
having an emission surface oriented with reference to a main beam direction, and
having a base light source disposed behind the emission surface and offset with reference to the emission surface,
wherein a radially active light guide body is disposed on the base light source, which body deflects light proceeding from the base light source radially with reference to the main beam direction, onto at least one passive reflector, which reflects the radially deflected light in the direction of the emission surface, and/or
wherein an axially active light guide body is disposed on the base light source, which body deflects light proceeding from the base light source axially with reference to the main beam direction, onto at least one deflection mirror, which reflects the light in the radial direction, onto a passive reflector that reflects the radially deflected light in the direction of the emission surface,
wherein at least one of the radially active light guide body and the axially active light guide body is disposed at a distance from the passive reflector,
wherein an attachment construction space is disposed within the offset axially in front of the base light source,
wherein the attachment construction space is for an attachment light source,
wherein the attachment light source has an attachment light source emission surface, and
wherein (i) the emission surface and the attachment light source emission surface make a flush transition into one another and/or (ii) a first body has the emission surface and a second body has the attachment light source emission surface with the first body and the second body being configured in one piece.

16. The vehicle light according to claim 15,
wherein the radially active light guide body has at least one radial coupling region, and
wherein coupled light proceeding from the base light source is radially refracted upon entry into the radial coupling region.

17. The vehicle light according to claim 15, wherein the deflection mirror and the passive reflector are spaced apart from one another.

18. The vehicle light according to claim 15, wherein the vehicle light comprises a combination of types of vehicle lights selected from the group consisting of a daytime running light, a position light, a side marker light, a brake light, a parking light, a turn signal light, a taillight, a high beam light, and a dimmed headlight.

19. The vehicle light according to claim 18,
wherein said combination of types comprises a first type of a vehicle light emitting weak light, and a second type of vehicle emitting strong light or requiring a large emission surface, and
wherein said first type is provided by the base light source and said second type is provided by way of the attachment light source.

20. The vehicle light according to claim 15, wherein a wall of the attachment construction space forms a wall of a light guide space or lies against one of the light guide bodies.

21. The vehicle light according to claim 15, wherein the vehicle light is a motorcycle light or a bicycle light.

22. A vehicle light
having an emission surface oriented with reference to a main beam direction, and
having a base light source disposed behind the emission surface and offset with reference to the emission surface,
wherein between the base light source and the emission surface, the light is first guided radially outward, proceeding from the base light source, in a light guide space that extends radially with reference to the main beam direction to a deflection region and from there axially with reference to the main beam direction to the emission surface, and subsequently, in the deflection region, is deflected in a direction axial with reference to the main beam direction, to the emission surface,
wherein an attachment construction space is disposed within the offset axially in front of the base light source,
wherein the attachment construction space is for an attachment light source,
wherein the attachment light source has an attachment light source emission surface, and
wherein (i) the emission surface and the attachment light source emission surface make a flush transition into one another and/or (ii) further comprising a first body having the emission surface and a second body having the attachment light source emission surface with the first body and the second body configured in one piece with the first body and having an attachment light source emission surface.

23. The vehicle light according to claim 22, wherein an axial expanse of the light guide space that extends radially with reference to the main beam direction to the deflection region is smaller than a radial expanse of the light guide space.

24. The vehicle light according to claim 22, wherein a radial expanse of the light guide space that extends axially with reference to the main emission direction to the emission surface is smaller than an axial expanse of the light guide space.

25. The vehicle light according to claim 22, wherein the vehicle light comprises a combination of types of vehicle lights selected from the group consisting of a daytime running light, a position light, a side marker light, a brake light, a parking light, a turn signal light, a taillight, a high beam light, and a dimmed headlight.

26. The vehicle light according to claim 25, wherein said combination of types comprises a first type of a vehicle light emitting weak light, and a second type of vehicle emitting strong light or requiring a large emission surface, and wherein said first type is provided by the base light source and said second type is provided by way of the attachment light source.

27. The vehicle light according to claim 22, wherein a wall of the attachment construction space forms a wall of the light guide space or lies against one of the light guide bodies.

28. The vehicle light according to claim 22, wherein the vehicle light is a motorcycle light or a bicycle light.

* * * * *